(12) United States Patent
Parla

(10) Patent No.: US 12,289,342 B2
(45) Date of Patent: Apr. 29, 2025

(54) DEPLOYING JUST IN TIME (JIT) DECEPTIONS AT SCALE IN NETWORKS

(71) Applicant: Cisco Technology, Inc., San Jose, CA (US)

(72) Inventor: Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 233 days.

(21) Appl. No.: 18/122,074

(22) Filed: Mar. 15, 2023

(65) Prior Publication Data

US 2024/0314167 A1   Sep. 19, 2024

(51) Int. Cl.
*H04L 9/40* (2022.01)

(52) U.S. Cl.
CPC .......... *H04L 63/1491* (2013.01); *H04L 63/20* (2013.01)

(58) Field of Classification Search
CPC .. H04L 63/1491; H04L 63/20; H04L 63/0227
USPC ........................................................ 726/1
See application file for complete search history.

(56) References Cited

U.S. PATENT DOCUMENTS

| | | | |
|---|---|---|---|
| 10,362,057 B1 | | 7/2019 | Wu |
| 11,934,948 B1 * | | 3/2024 | Ferguson-Walter ... G06N 3/045 |
| 2017/0093910 A1 * | | 3/2017 | Gukal ................. H04L 63/1491 |
| 2017/0134421 A1 | | 5/2017 | Touboul et al. |
| 2017/0310704 A1 * | | 10/2017 | Wu ..................... H04L 63/1433 |
| 2017/0353491 A1 | | 12/2017 | Gukal et al. |
| 2022/0128985 A1 | | 4/2022 | Szigeti et al. |
| 2024/0015183 A1 * | | 1/2024 | Bahirat ............... H04L 63/1491 |
| 2024/0163312 A1 * | | 5/2024 | Azad ....................... H04L 63/20 |
| 2024/0314169 A1 * | | 9/2024 | Azad .................. H04L 63/1491 |

FOREIGN PATENT DOCUMENTS

DE         102015002367         9/2015

OTHER PUBLICATIONS

International Search Report and Written Opinion for International Application No. PCT/US2024/019567, mailed Jul. 10, 2024, 15 Pages.
Misrahi, Rami "Deploying Deception in the Enterprise Network", May 21, 2020, Fidelis Cybersecurity, 4 pages.

* cited by examiner

*Primary Examiner* — Frantz B Jean
(74) *Attorney, Agent, or Firm* — Lee & Hayes, P.C.

(57) ABSTRACT

Techniques for utilizing a deception service to deploy deceptions at scale in a network, such as, for example, a client network. The deception service may be configured to generate a small number (e.g., 5, 10, 15, etc.) of deceptions of hosts and/or services associated with the network (or emulations of the hosts/services and/or emulations of protocols associated with the hosts/services) and deploy them to a number of deception host computing devices that cover all of the components and/or technologies found in the network. The deception service may map a large number (e.g., 1000, 100,000, 1,000,000, etc.) of IP addresses available in the network to the deceptions, making it appear as though a large number of deceptions exist, when in reality the IP addresses map back to a small number of deceptions. The deception service may assign/unassign IP addresses to and/ or from deceptions and/or actual hosts in the network as needed.

20 Claims, 12 Drawing Sheets ns to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application or another type of functionality to an enterprise of users. While hyperscaler-based datacenters are growing in popularity, traditional enterprise-managed datacenters are still widely used. The combination of these deployments is usually described as 'hybrid' datacenters. Generally, remote users are able to connect to these network-based applications and/or enterprise functionalities using Zero Trust Network Access (ZTNA) solutions.

While ZTNA solutions may provide a method for an enterprise user to establish secure remote access to computing resources, ZTNA lacks the ability to prioritize traffic in such a way that the ZTNA solution can signal the system to give compute and network prioritization to a stream within a multiplexed flow. For example, if a ZTNA session had two types of traffic (e.g., real-time traffic and web traffic) multiplexed together in a single connection, there exists no good means by which to prioritize one type of traffic over another.

Further, ZTNA solutions traditionally rely on a single gateway to enforce access policies defined by a network. If a malicious user (e.g., a network attacker) successfully bypasses or compromises that gateway, the user would have access to the resources served by that gateway. As such, there is a need to reduce the attack surface of such ZTNA solutions.

Additionally, deploying deceptions in a network can result in increased network security by diluting actual hostnames with deception hostnames advertised on the network. However, such deceptions are difficult to deploy in practice. For example, it is difficult to scale the number of deceptions in a way that provides sufficient security for a network while simultaneously not using a large amount of compute resources to host such deceptions. Additionally, having to manage honeypots is difficult to do when the size of the infrastructure to do so exceeds a relatively small boundary. Moreover, as network topologies continue to increase in complexity, the deployment and management of deception solutions becomes increasingly difficult. Furthermore, cloud-delivered security solutions such as secure access service edge (SASE) and ZTNA need to be able to scale the solution across a large number of customers in a way that the actual deception nodes are relatively small.

DEPLOYING JUST IN TIME (JIT) DECEPTIONS AT SCALE IN NETWORKS

TECHNICAL FIELD

The present disclosure relates generally to prioritizing individual channels within multiplexed streams, utilizing authorization chains to reduce the attack surface of connection(s) between client(s) and network resource(s), and/or deploying deceptions at scale in networks.

BACKGROUND

Cloud-based service provider networks, often described as 'hyperscalers', offer cloud-based services to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application or another type of functionality to an enterprise of users. While hyperscaler-based datacenters are growing in popularity, traditional enterprise-managed datacenters are still widely used. The combination of these deployments is usually described as 'hybrid' datacenters. Generally, remote users are able to connect to these network-based applications and/or enterprise functionalities using Zero Trust Network Access (ZTNA) solutions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
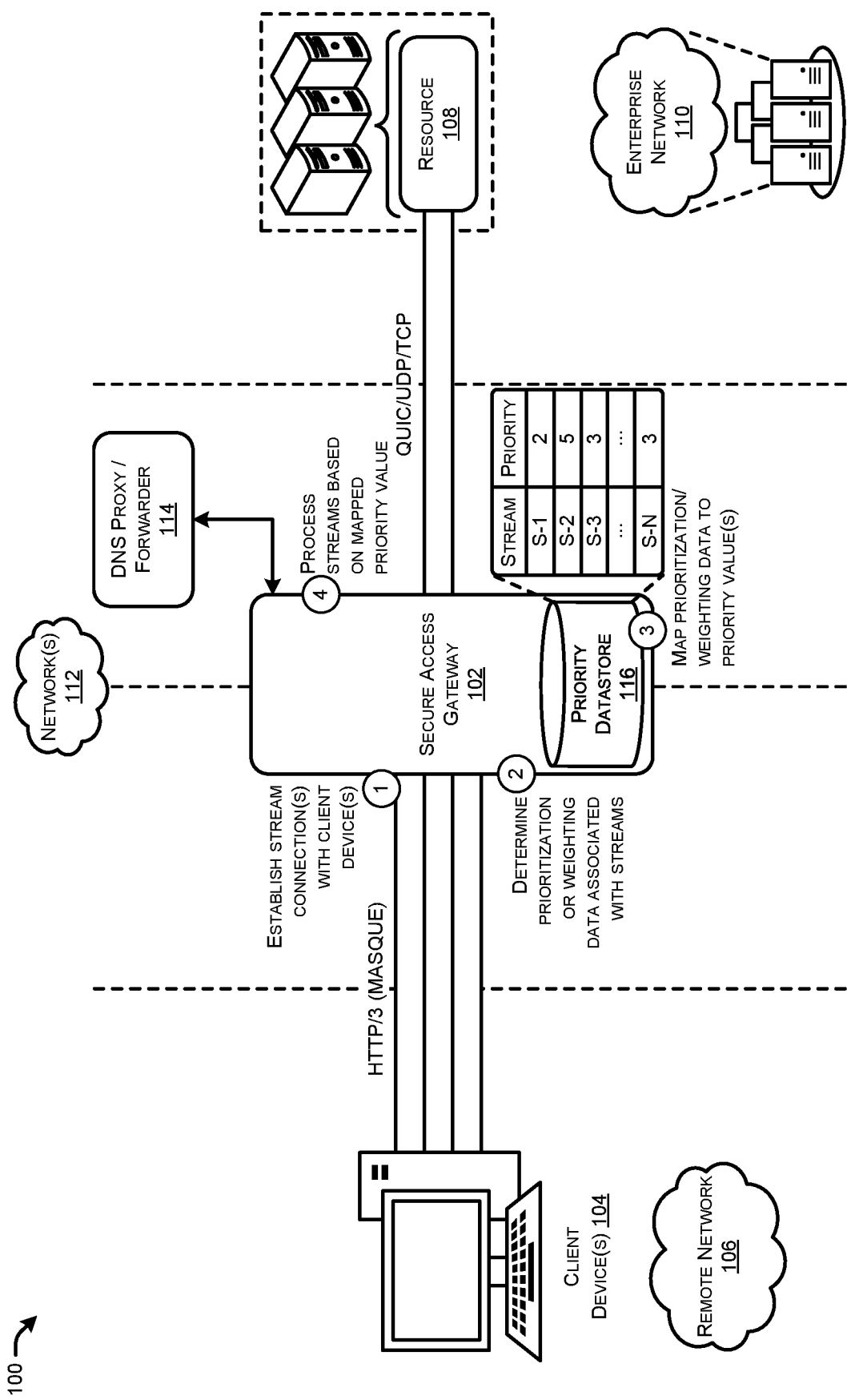
FIG. 1 illustrates a system-architecture diagram of an example environment for a secure access gateway configured to assign compute and/or network prioritization to individual streams within a multiplexed session for ZTNA connecting a client device in a remote network with a target resource of an enterprise network.

This disclosure describes methods for prioritizing individual channels within multiplexed streams, utilizing authorization chains to reduce the attack surface of connection(s) between client(s) and network resource(s), and/or deploying deceptions at scale in networks. The method includes establishing, by a secure access gateway, a first data stream connection with one or more client devices. In some examples, the first data stream connection may comprise a first hypertext transfer protocol (HTTP) protocol. Additionally, or alternatively, the method includes establishing, by the secure access gateway, a second data stream connection with the one or more client devices. In some examples, the second data stream connection may comprise a second HTTP protocol that is different from the first HTTP protocol. Additionally, or alternatively, the method includes determining, by the secure access gateway and based at least in part on the one or more client devices, first prioritization data associated with the first data stream. Additionally, or alternatively, the method includes determining, by the secure access gateway and based at least in part on the second data stream, first weighting data associated with the second data stream. Additionally, or alternatively, the method includes storing, by the secure access gateway and based at least in part on the first prioritization data, a first mapping between the first data stream and a first priority value. Additionally, or alternatively, the method includes storing, by the secure access gateway and based at least in part on the first weighting data, a second mapping between the second data stream and a second priority value. Additionally, or alternatively, the method includes determining that the first priority value is more favorable than the second priority value. Additionally, or alternatively, the method includes processing the first data stream prior to processing the second data stream based at least in part on the first priority value being more favorable than the second priority value.

Additionally, or alternatively, the method includes establishing, by a secure access gateway, a multiplexed data stream connection with one or more client devices. Additionally, or alternatively, the method includes determining, by the secure access gateway, a first indication of first prioritization data associated with a first data stream of the multiplexed data stream, the first data stream being associated with a first network protocol. Additionally, or alternatively, the method includes determining, by the secure access gateway, a second indication of first weighting data associated with a second data stream of the multiplexed data stream, the second data stream being associated with a second network protocol that is different from the first network protocol. Additionally, or alternatively, the method includes storing, by the secure access gateway and based at least in part on the first indication, a first mapping between the first data stream and a first priority value. Additionally, or alternatively, the method includes storing, by the secure access gateway and based at least in part on the second indication, a second mapping between the second data stream and a second priority value. Additionally, or alternatively, the method includes performing a first operation associated with the first data stream prior to performing a second operation associated with the second data stream based at least in part on the first priority value being more favorable than the second priority value.

Additionally, or alternatively, the method includes generating a packet by a first computing device, the packet indicating a request to connect to a target resource. Additionally, or alternatively, the method includes identifying, based at least in part on the target resource, an authorization chain along a network path between the first computing device and the target resource. In some examples, the authorization chain may include nodes authorization requirements that are to be satisfied to connect to the target resource. Additionally, or alternatively, the method includes identifying authorization credentials for satisfying the authorization requirements. Additionally, or alternatively, the method includes generating an encapsulated packet based at least in part on encapsulating the packet with individual layers corresponding to the authorization credentials. Additionally, or alternatively, the method includes sending the encapsulated packet from the first computing device to the target resource via the authorization chain of nodes. Additionally, or alternatively, the method includes receiving, at the first computing device, a first request to authenticate a user with the target resource, the user being associated with the first computing device. Additionally, or alternatively, the method includes sending, to the target resource and in response to the first request to authenticate the user, authentication credentials corresponding to the target resource.

Additionally, or alternatively, the method includes determining, by a first computing device and based at least in part on a target resource, nodes along a network path between the first computing device and the target resource, the nodes comprising authorization requirements associated with connecting to the target resource. Additionally, or alternatively, the method includes identifying authorization credentials corresponding to the authorization requirements. Additionally, or alternatively, the method includes generating a packet indicating a request to connect to the target resource, the packet including encrypted authorization credentials corresponding to the authorization requirements. Additionally, or alternatively, the method includes sending the packet from the first computing device to the target resource via the nodes. Additionally, or alternatively, the method includes receiving a request to authenticate a user with the target resource, the user being associated with the first computing device. Additionally, or alternatively, the method includes sending authentication credentials to the target resource.

Additionally, or alternatively, the method includes determining, by a first computing device and based at least in part on a target resource, nodes along a network path between the first computing device and the target resource, the nodes comprising authorization requirements associated with connecting to the target resource. Additionally, or alternatively, the method includes identifying authorization credentials corresponding to the authorization requirements. Additionally, or alternatively, the method includes storing the authorization credentials in blocks of a ledger associated with a blockchain network. Additionally, or alternatively, the method includes generating a packet indicating a request to connect to the target resource, the packet including indications of addresses of the blocks associated with the blockchain network, the blocks including the authorization credentials corresponding to the authorization requirements. Additionally, or alternatively, the method includes sending the packet from the first computing devices to the target resource via the nodes. Additionally, or alternatively, the method includes receiving a request to authenticate a user with the target resource, the user being associated with the first computing device. Additionally, or alternatively, the method includes sending authentication credentials to the target resource.

Additionally, or alternatively, the method includes determining, by a deception service associated with a network, a threshold amount of computing resource types associated with the network. Additionally, or alternatively, the method includes executing a dynamic amount of deception host computing devices to satisfy the threshold amount of computing resource types associated with the network. Additionally, or alternatively, the method includes determining a number of deceptions to emulate on the network. Additionally, or alternatively, the method includes generating the number of the deceptions to emulate on the deception host computing devices, the deceptions being associated with the computing resource types. Additionally, or alternatively, the method includes storing a first mapping between the deceptions and the deception host computing devices, the first mapping being based at least in part on protocols associated with the deceptions and the computing resource types associated with the deception host computing devices. Additionally, or alternatively, the method includes deploying the deceptions to the deception host computing devices based at least in part on the first mapping.

Additionally, or alternatively, the method includes executing, by a deception service associated with a network, a dynamic amount of deception host computing devices to satisfy a threshold amount of computing resource types associated with the network, the deception host computing devices being configured to emulate a threshold amount of deceptions on the network. Additionally, or alternatively, the method includes determining that a first device has satisfied a threshold interaction associated with a first deception of the deceptions on the network. Additionally, or alternatively, the method includes determining a first internet protocol (IP) address associated with the first deception. Additionally, or alternatively, the method includes isolating the first deception from the deceptions based at least in part on the first IP address. Additionally, or alternatively, the method includes determining that an amount of deceptions on the network is below the threshold amount of deceptions. Additionally, or alternatively, the method includes generating a second deception based at least in part on determining that the amount of deceptions on the network is below the threshold amount of deceptions, the second deception having a deception type that is the same as the first deception. Additionally, or alternatively, the method includes deploying the second deception to be emulated on the deception host computing devices, the second deception being assigned a second IP address that is different from the first IP address.

Additionally, the techniques described herein may be performed by a system and/or device having non-transitory computer-readable media storing computer-executable instructions that, when executed by one or more processors, performs the method described above.

Example Embodiments

This disclosure describes methods for prioritizing individual channels within multiplexed streams, utilizing authorization chains to reduce the attack surface of connection(s) between client(s) and network resource(s), and deploying deceptions at scale in networks. In some examples, a secure access gateway may be configured to establish a multiplexed data stream connection with one or more client devices. In some examples, the secure access gateway may be configured as a VPN, a proxy, an HTTPs server, and/or any other system that allows access to resources in a secure manner. Additionally, or alternatively, the secure access gateway may employ various protocols, such as, for example, datagram transport layer security (DTLS), hypertext transfer protocol (HTTP)/2, HTTP/3, QUIC, and/or any other secure protocols. The secure access gateway may be configured to establish the multiplexed connection using ZTNA techniques. The secure access gateway may determine indications of prioritization data and/or weighting data associated with individual streams of the multiplex data stream, where the streams may employ different networking protocols (e.g., HTTP/2, HTTP/3, etc.) and use the indications of prioritization data and/or weighting data to determine a gateway priority value of the streams. In some examples, the secure access gateway may then store and/or utilize the gateway priority values to process a given stream over another. Additionally, or alternatively, a client computing device may establish a ZTNA connection with a target resource of an enterprise network, for example. In some examples, the ZTNA connection may be established via one or more authorization nodes (e.g., network proxies, network relays, and/or the like) configured as an authorization chain, each being associated with an authorization requirement that requires a particular credential for successful authorization of the client device at a given authorization node. In some examples, the client device may be configured to generate a packet comprising one or more authorization credentials configured to satisfy authorization requirements at the authorization nodes and sequentially authorize the client device, and the client device may send the packet through the authorization chain. Once the authorization chain has been successfully traversed, a user of the client device may be required to authenticate with the target resource to establish the connection. Additionally, or alternatively, a deception service may be employed to deploy deceptions at scale in a network. In some examples, the deception service may be in communication with a DNS proxy, a programmable network address translation (NAT) service, and/or a dynamic host configuration protocol (DHCP) proxy to deploy the deceptions in the network. The deception service may be configured to determine a threshold amount of computing resource types associated with the network so that the deception service may execute a dynamic amount of deception host computing devices to satisfy the threshold amount of computing resource types. The deception service may determine a number (or a percentage) of deceptions (e.g., emulations of protocols utilized by computing resource types, virtual machines emulating computing resource types, etc.) to emulate on the network and generate the deceptions. In some examples, the deception service may map the deceptions to the deception host computing devices based on various protocols associated with each and deploy the deceptions to the corresponding deception host computing devices. The deception service may also assign a large number of IP addresses to a single deception, making it appear as though many hosts are joining the network, when in reality such hosts map back to a small number of actual deceptions.

As previously described, a secure access gateway may be configured to assign compute and networking prioritization to individual streams within the HTTP/2 and/or HTTP/3 multiplexed session for ZTNA. In some examples, the secure access gateway may be configured as a VPN, a proxy, an HTTPs server, and/or any other system that allows access to resources in a secure manner. Additionally, or alternatively, the secure access gateway may employ various protocols, such as, for example, datagram transport layer security (DTLS), hypertext transfer protocol (HTTP)/2, HTTP/3, QUIC, and/or any other secure protocols. Both HTTP/2 and HTTP/3 have the ability to perform prioritization of traffic in a multiplexed stream. For example, HTTP/2 includes a built in a dependency weighting value that allocates all dependent streams an integer weight between 1 and 256 (e.g., see RFC 7540). Additionally, or alternatively, HTTP/3 includes a priority header field that allows an HTTP client to communicate preferences with respect to priority (e.g., see RFC 9218). In some examples, these prioritizations may be utilized to prioritize Zero-Trust traffic leveraging the multiplexing capabilities of a forward proxy built into both HTTP/3 (e.g., MASQUE) and HTTP/3 (e.g., CONNECT method) as described herein. As such, the forward proxy capabilities of HTTP/3 and HTTP/2 (e.g., as a fallback when HTTP/3 is not possible) may be used to deliver ZTNA via a proxy system. In some examples, the HTTP/2 protocol may be enhanced with a CONNECT-UDP or CONNECT-IP method found in HTTP/3 to allow transporting of IP, UDP and TCP via HTTP forward proxying as a fallback when UDP:443 cannot traverse a network, such as, for example, an enterprise that limits outbound traffic to only TCP:443. Using this approach, a multiplexed stream may be built on HTTP/2 or HTTP/3 via a forward proxy technique to implement ZTNA for a network. Traditionally, the ability to prioritize different traffic in ZTNA solutions is not possible.

Using the techniques described herein, forward proxy techniques (e.g., implemented via a secure access gateway) may be combined with the built-in capabilities to prioritize both HTTP/2 and HTTP/3 traffic for ZTNA. For example, using the built-in dependency weighting and/or priority information provided by HTTP/2 and/or HTTP/3, a client may indicate to the ZTNA server what the priority is for a given stream. The ZTNA server may then prioritize the compute (e.g., encryption, decryption, proxying, etc.) and/or the networking (e.g., routing, forwarding, stream encapsulation, stream decapsulation, etc.) resources to ensure that the priority traffic is processed (by both compute and/or networking resources) first, prior to the lower priority traffic. That is, those built-in priority and/or weighting information may be mapped back to network prioritization like quality of service (QOS) bits, for example, or other network prioritization schemes, as well as CPU, dataplane, etc. processing at the secure access gateway.

In HTTP/2 there are 1-256 possible weighting values. Using these built-in weighting values, a gateway priority value (or other form of scoring) may be determined to cover all of the multiplexed traffic that will be in a forward proxy request for a given ZTNA session. Typically, a ZTNA session may handle a subset of access requests when compared to a traditional VPN session. In other words, each of the forward proxy sessions (or other similar technologies) will likely only carry a handful of access requests for a given proxy session. Therefore, it is likely that multiple ZTNA proxy sessions from a given endpoint will be carried in one or more multiplexed sessions. Using the techniques described herein, each proxy session can have a priority independent of the multiplexed streams, such that a given proxy session is treated with higher priority than another proxy session using the same concepts of weighting described for streams within a multiplexed session. That is, a proxy, which is servicing many ZTNA sessions from many users, may prioritize real-time traffic over other traffic types that may not require the same compute and/or networking resources (e.g., web requests) such that all of the real-time traffic across the entire set of user sessions is given priority over other traffic types like web requests. In some examples, endpoint software (e.g., a target resource) may also do the same prioritization on the reverse network path so that the real-time traffic (or other high-priority traffic) is processed before a lower priority stream in terms of both compute and/or networking resources. Additionally, or alternatively, since a secure access gateway is handling sessions from many users, the techniques described herein may also allow for a given user to have prioritization over another user if such a system were desirable.

Take, for example, a secure access gateway configured to provide client devices secure remote access to a target resource via ZTNA. In some examples, the secure access gateway may establish a multiplexed data stream with one or more client devices. For example, the secure access gateway may establish a first data stream connection with one or more client devices and/or a second data stream connection with the one or more client devices. In some examples, the first data stream connection may comprise a first HTTP protocol, such as, for example, HTTP/3. Additionally, or alternatively, the second data stream connection may comprise a second HTTP protocol, such as, for example, HTTP/2. That is, individual data streams included in the multiplexed data stream may be configured as an HTTP/2 and/or HTTP/3 connections.

Once the multiplexed connection has been established with the one or more client devices, the secure access gateway may be configured to determine an indication of prioritization data associated with the first data stream of the multiplexed data stream. In some examples, the secure access gateway may determine the prioritization data based on the one or more client devices. That is, the one or more client devices may express the prioritization data associated with the first data stream in a priority header field associated with a data packet and/or the connection. Additionally, or alternatively, the secure access gateway may be configured to determine an indication of weighting data associated with the second data stream of the multiplexed data stream. In some examples, the secure access gateway may determine the weighting data based on the one or more weighting bits associated with the second data stream. That is, a data packet associated with the second data stream connection may include one or more bits indicating the weighting data, as previously described. With the weighting data and/or priority data determined for the data streams, the secure access gateway may map the individual weighting data and/or priority data to gateway priority values at the secure access gateway The weighting data and/or priority data may indicate, for a given data stream of the multiplexed data stream, a type of network traffic associated with the data stream. In some examples, the secure access gateway may determine a gateway priority value based on the type of network traffic. For example, the priority data associated with the first data stream may indicate that the first data stream is associated with a web request, and the weighting data associated with the second data stream may indicate that the second data stream is associated with real-time traffic. In such a scenario, the secure access gateway may be configured to assign a more favorable gateway priority value to the second data stream based on the real-time traffic being prioritized over web request traffic. In some examples, the secure access gateway may determine the gateway priority values based on a policy enforced at the secure access gateway. In some examples, the policy may indicate a gateway priority value associated with given network traffic types, where the traffic types may be determined based on the data streams, the client devices, the target resource, the weighting data, and/or the prioritization data. Additionally, or alternatively, the policy may indicate which built-in weighting values of HTTP/2 are more favorable than the prioritization data associated with HTTP/3. Additionally, or alternatively, the policy may indicate particular users and/or roles associated with particular users that should be prioritized over others.

For example, the secure access gateway may determine that the prioritization data associated with the first data stream maps to a first gateway priority value, and the weighting data associated with the second data stream maps to a second gateway priority value. In some examples, a gateway priority value may be configured as an integer, and secure access gateway may be configured to prioritize one stream over another stream based on the associated gateway priority value. Additionally, or alternatively, a gateway priority value may be represented by one or more QoS bits. Consider such an example where the prioritization data associated with the first stream maps to a first gateway priority value of 2 and the weighting data associated with the second stream maps to a second gateway priority value of 5. The secure access gateway may determine that the second gateway priority value is more favorable than the first gateway priority value based on the second gateway priority value being greater than the first gateway priority value. Then, based on the second gateway priority value being more favorable than the first gateway priority value, the secure access gateway may process (e.g., performing an encryption process, a decryption process, a proxy process, a routing process, a forwarding process, an encapsulation process, a decapsulation process, and/or any other form of compute and/or network process) the second data stream prior to processing the first data stream.

Additionally, or alternatively, the secure access gateway may comprise a priority data store, where the gateway priority values may be stored. For example, the secure access gateway may store a first mapping between the first stream (and/or the prioritization data) and the first gateway priority value and/or a second mapping between the second stream (and/or the weighting data) and the second gateway priority value. In some examples, the secure access gateway may send indications of the gateway priority value(s) to associated target resource(s) and/or the client devices, where each respective device may utilize the gateway priority values to prioritize the streams (in the reverse direction for example).

The secure access gateway may then determine a target resource associated with a given data stream of the multiplexed data stream. For example, the secure access gateway may determine a target resource associated with the second data stream and establish a third data stream connection between the secure access gateway and the target resource. In some examples, the third data stream may comprise a QUIC protocol, a UDP protocol, and/or a transmission control protocol (TCP). The secure access gateway may then be configured to process and/or transmit network traffic associated with the second data stream to the target resource prior to processing and/or transmitting network traffic associated with the first data stream to the target resource and/or an additional target resource. As previously described, the secure access gateway may determine one or more QoS bits that indicate and/or represent the gateway priority value and send the one or more QoS bits to the target resource, such that network traffic traveling in the opposite direction (e.g., from the target resource and toward the client device) is prioritized in the same manner.

As previously described, a client computing device may establish a ZTNA connection with a target resource of an enterprise network, for example, via one or more authorization nodes (e.g., network proxies, network relays, and/or the like) configured as an authorization chain. For example, one or more relays may be used to effectively route traffic to a proxy node and/or a VPN node in such a way that each relay authorizes connecting to the next stage. In some examples, such a method uses relays and authorization token chains in order to allow access to the next hop in the network. Various implementations utilizing relays and/or token chains are described in more detail below.

In some examples, the MASQUE protocol may be leveraged to create an authorization chain for a client device to access a target resource. Take for example, a two-stage authorization chain (e.g., two nodes requiring authorization). A first stage may be a first node configured as a relay that requires a first authorization credential (also referred to herein as an authorization token, a bearer token, etc.), such as, for example, a privacy pass token. This first node may enforce course-grained device-level access policies before proceeding to the next stage in the chain. If the first stage in the authorization chain is successfully traversed, a second stage may require a second authorization credential. For example, the second stage may be a second node configured as a proxy that requires the second authorization credential, such as, for example, a client certificate. In order to relay the session to the target destination, the second node may require the client certificate to be presented. In such a scenario, the resource access grant is done via a different token at the second stage than at the first stage. Thus, the token chain above contains two links that are to be satisfied first by the privacy pass, and then the client certificate. This implementation of the authorization chain is referred to herein as onion layer encapsulation.

By configuring an authorization chain in this way, an unauthorized device cannot even reach the second node configured as the proxy to the target resource. Once the proxy is reached, only an authorized user can access the target resource. In some examples, a packet may be encapsulated with layers corresponding to the authorization stages, where each layer in the sequence may be encrypted and may carry the authentication token needed to continue to the next stage. That is, each layer may have its own encryption and authentication components for that layer. This may be referred to herein as onion routing, where each layer is conceptualized as an onion layer. Each layer in the onion may be exposed if a policy is met at the prior layer (e.g., a second layer comprising the client certificate may be exposed following satisfaction of the first stage by presenting the first layer comprising the privacy pass token). Ultimately, the onion layers may be traversed until the core is reached (e.g., the target resource) only after satisfying the policies needed at each outer layer.

As previously described, the encapsulated packet may include two layers, a first outer layer comprising a privacy pass token and a second inner layer comprising the client certificate. Additionally, a third inner-most layer may be conceptualized. For example, the third inner layer may correspond to single sign on (SSO) user credentials for accessing the target resource. That is, once the first two stages are satisfied by the corresponding authorization credentials, a third and final stage may be reached at the target resource, where a user may be required to provide SSO user credentials to access the target resource. In such an example, all three stages of the authorization chain would need to be comprised in order for a an unauthorized user to reach the target resource. While example authorization credentials are described, any non-user-interactive credential (e.g., a privacy pass token, a client certificate, and/or any other type of authorization credential) and/or any user interactive credential (e.g., SSO user credentials, biometric credentials, etc.) may be leveraged at any stage in an authorization chain.

Additionally, or alternatively, the authorization chain may be configured with a single encryption layer between the target resource and the client device. In such an example, the authorization chain may be inline with the flow at the beginning of the traffic as metadata. This may be achieved using various encapsulation protocols such as, for example, Generic Network Virtualization Encapsulation (GENEVE), Generic Routing Encapsulation (GRE), Generic UDP encapsulation (GUE), the Proxy Protocol, and the like. This implementation of the authorization chain is referred to herein as single encryption inline encapsulation.

In such a configuration, each authorization token may be carried in as a link in the chain. In some examples, there may be no requirement to sequentially place the authorization tokens in order (in contrast to the onion routing example described above, where the packet was encapsulated with layers in an order corresponding to the authorization chain). Additionally, or alternatively, it may provide computational improvements to sequentially order the authorization tokens, avoiding analyzing the entire chain for a matching token. Each token may be encrypted in a way that only the node associated with the token (e.g., the node enforcing the authorization stage) can decrypt the token. This encryption may be performed using any encryption protocols, such as, for example, hybrid public key encryption (HPKE) and the like.

In some examples, an authorization credential (e.g., a bearer token) may not be presented in-band with the flow. In such a scenario, the protocol can indicate that the token will be received out of band and how to associate the flow with a given out of band authentication and authorization. As noted, tokens may not be required to be configured in a sequential order. Additionally, as the tokens are processed, they may be removed by the node in the authorization chain that processed that token from the chain of tokens. Additionally, or alternatively, a bit in the payload may be configured to be modified by the node in the authorization chain that processed that token to indicate that the token has been expended.

Additionally, or alternatively, the token chain may be implemented using blockchain technologies. That is, the authorization tokens may be stored in one or more blocks of a ledger associated with a blockchain network. In some examples, each block may store an encrypted token, and the blocks may be required to satisfy a policy requirement of a given node in order to traverse to the next node in the authorization chain. Additionally, or alternatively, each block may store the hash of the previous blocks header, such that a given block can verify that the policy requirement at the previous node was satisfied by computing the hash. This implementation of the authorization chain is referred to herein as single encryption blockchain encapsulation.

Take, for example, a user of a client computing device attempting to establish a ZTNA connection to a target resource. The network path between the client computing device and the target resource may comprise an authorization chain including one or more nodes comprising authorization requirements that are to be satisfied to connect to the target resource. The nodes may be configured as a proxy node, a relay node, and/or the like. In some examples, the client computing device may generate a packet encapsulated with encryption layers of authorization credentials configured to satisfy the authorization requirements associated with the nodes, as previously described in the onion layer encapsulation implementation of the authorization chain.

The client computing device may be configured to generate a packet indicating a request to connect to the target resource. In some examples, the client computing device may identify the authorization chain based at least in part on the target resource. That is, the client computing device may identify the individual nodes and the authorization requirements that are associated with the individual nodes. Once the authorization chain has been identified, the client computing device may then identify the authorization credentials that will be utilized to satisfy the authorization requirements associated with the nodes of the authorization chain. In some examples, the authorization credentials may be stored on the client computing device and/or stored remotely in a datastore that is accessible by the client computing device.

The client computing device may also be configured to generate an encapsulated packet by encapsulating the packet that was previously generated with individual encryption layers comprising the authorization credentials. In some examples, the client computing device may determine an order of the nodes in the authorization chain (e.g., an order of the nodes that will be traversed on the network path to the target resource). The client computing device may utilize the order of the nodes to generate the encapsulated packet by encapsulating the packet with the encryption layers according to the order of the nodes. That is, the outermost encryption layer of the encapsulated packet may comprise a first authorization credential utilized to satisfy the first authorization requirement associated with the first node in the authorization chain that will be reached. Additionally, or alternatively, the innermost encryption layer of the encapsulated packet may comprise a second authorization credential utilized to satisfy the last authorization requirement associated with the last node in the authorization chain that will be reached prior to the target resource. In some examples, the authorization chain may include any number of nodes from 1-N, where N may be any integer greater than 1. Additionally, or alternatively, the encapsulated packet may include any number of encryption layers from 1-N, where N may be any integer greater than 1.

With the encapsulated packet generated, the client computing device may be configured to send the encapsulated packet to the target resource via the authorization chain of nodes. For example, the client computing device may send the encapsulated packet to the first node of the authorization chain. The first node may consume the authorization credential associated with the outermost encryption layer. That is, the first node may be configured to decrypt the outermost encryption layer and access the authorization credential comprised therein. In some examples, the consumption of the authorization credential may result in removal of the outermost encryption (or encapsulation) layer by the first node, leaving the second encryption layer as the new outermost encryption layer after consumption. Additionally, or alternatively, an authorization credential associated with a given encryption layer may be configured as interactive authorization credential (e.g., requiring interaction of some kind by the user of the client computing device) or a non-interactive authorization credential (e.g., a privacy pass, a client certificate, and/or any other form of authorization token). In examples where an authorization credential is configured as an interactive authorization credential, the corresponding node may communicate instructions for satisfying the interactive authorization credential back to the client computing device.

Following traversal of the authorization chain of nodes, and the satisfaction of the corresponding authorization requirements at each, the target resource may send a request to authenticate the user associated with the client computing device with the target resource. The client computing device may display the request for authentication prompting the user for the necessary input. Once the user provides the input of authentication credentials to the client computing device, the client computing device may send the authentication response including authentication credentials to the target resource, where the user may be authenticated with the target resource, and a connection may be established.

Additionally, or alternatively, the authorization chain may be configured with a single encryption layer between the client computing device and the target resource, as previously described with respect to the single encryption inline encapsulation and/or the single encryption blockchain embodiment(s). That is, the authorization chain may be configured such that it is inline with the flow at the beginning of the traffic as metadata. The authorization chain may include one or more nodes comprising authorization requirements that are to be satisfied to connect to the target resource. As previously described, the nodes may be configured as a proxy node, a relay node, and/or the like.

In some examples, the client computing device may be configured to determine the nodes along a network path (e.g., an authorization chain of nodes) between the first computing device and a target resource based on the target resource. Each of the nodes may comprise an authorization requirement that is required to be satisfied prior to proceeding to the next node. Once the nodes along the network path have been identified, the client computing device may then identify the authorization credentials that will be utilized to satisfy the authorization requirements associated with the nodes along the network path. In some examples, the authorization credentials may be stored on the client computing device and/or stored remotely in a datastore that is accessible by the client computing device.

The client computing device may also be configured to generate a packet indicating a request to connect to the target resource. In some examples, the packet may include the authorization credentials corresponding to the authorization requirements. Additionally, or alternatively, each authorization credential may be encrypted using a type of encryption corresponding to the node comprising the associated authorization requirement. That is, an authorization credential may be encrypted in a way such that only the node comprising the corresponding authorization requirement may be configured to decrypt the corresponding authorization credential.

Additionally, or alternatively, the client computing device may be configured to store the identified authorization credentials in blocks of a ledger associated with a blockchain network. The client computing device may then generate a packet indicating a request to connect to the target resource. In some examples, the packet may include indications of addresses of the blocks associated with the blockchain network. That is, individual authorization credentials may be stored in individual blocks of a blockchain network and may be accessed via the addresses. Additionally, or alternatively, each authorization credential may be encrypted using a type of encryption corresponding to the node comprising the associated authorization requirement. That is, an authorization credential may be encrypted in a way such that only the node comprising the corresponding authorization requirement may be configured to decrypt the corresponding authorization credential.

With the packet generated, the client computing device may be configured to send the packet to the target resource via the nodes along the network path. For example, the client computing device may send the packet to the first node of the nodes. The first node may consume the authorization credential configured to satisfy the corresponding authorization requirement. That is, the first node may be configured to decrypt and access the authorization credential comprised therein. In some examples, the consumption of the authorization credential may result modifying at least a bit in the packet indicating that the authorization credential has been expended. Additionally, or alternatively, a subsequent node receiving the packet may check for the bit indicating that the previous authorization credential has been expended prior to decrypting the next authorization credential. In examples where the authorization credentials are stored in blocks of a blockchain, a node may modify the hash of a block to indicate that the corresponding authorization credential has been expended, and a subsequent node may utilize the next block to confirm that the previous authorization credential has been expended. For example, the node may check the block header for a hash of the previous block to determine that the previous authorization credential has been expended. Additionally, or alternatively, an authorization credential associated may be configured as interactive authorization credential (e.g., requiring interaction of some kind by the user of the client computing device) or a non-interactive authorization credential (e.g., a privacy pass, a client certificate, and/or any other form of authorization token). In examples where an authorization credential is configured as an interactive authorization credential, the corresponding node may communicate instructions for satisfying the interactive authorization credential back to the client computing device.

Following traversal of the nodes along the network path, and the satisfaction of the corresponding authorization requirements at each, the target resource may send a request to authenticate the user associated with the client computing device with the target resource. The client computing device may display the request for authentication prompting the user for the necessary input. Once the user provides the input of authentication credentials to the client computing device, the client computing device may send the authentication response including authentication credentials to the target resource, where the user may be authenticated with the target resource, and a connection may be established.

As previously described, a deception service may be employed to deploy deceptions at scale in a network. For example, a deception service may utilize and/or be comprised of a DNS proxy configured to make it appear as though many hosts are joining the network, a NAT service configured to dynamically translate network traffic to and from deception hosts, and/or a DHCP monitor/proxy configured to consume and free IP addresses in the network as needed. The deception services and/or the components thereof are described in more detail below.

The deception service may be configured such that a small number of deception hosts will actually exist. In some examples, the deception service may configured the deception hosts with enough hosts to cover all of the operating systems (OS) and/or components typically found in the networks datacenter (e.g., an enterprise datacenter), such as, for example, an active directory, a domain server, a web server, a directory server, an application server, a file server, an OS server, a database server, and/or the like. For example, there would be a small pool of active directory server deceptions. Initially, a configurable amount of each deception type will be spun up on physical, virtual and/or container hosts. In some examples, each of these options may be policy driven (e.g., the configurable amount of each deception type, type of host, etc.). Such a configuration may be driven by the deception service provider (e.g. a SASE vendor) rather than by the individual customers using the deception service. An option could be available to allow custom deceptions that a customer would be able to modify to match their enterprise environment and put these in a customer-specific pool. For example, a customer might want to deploy an active directory deception that more closely matched their enterprise configuration. Additionally, or alternatively, deceptions may be a mix of actual systems and emulations. In some examples, where possible, emulations of protocols are used instead of hosting the actual service. For example, an SSH emulator would be sufficient to attract an attacker, while at the same time produce a low false positive detection rate, thus saving on compute resources. Further, physical hosts may be used and reserved for physical host types of attacks that can't be virtualized or containerized due to a technical reason.

As previously described, the deception service may leverage a DHCP proxy (or instances thereof) and/or a programmable NAT service. Once the initial deceptions are deployed, they may interact with the DHCP proxy. The DHCP proxy instances may proxy DHCP request to customer networks (bidirectionally). In some examples, policies may allow a customer to choose how many deceptions they want to emulate on the network using the DHCP proxy. Additionally, or alternatively, the DHCP proxy may be configured such that it will look like many hosts are joining the customer's network, when in reality all of the hosts map back to the small set of actual deceptions. The percentage of unused network addresses may be configurable such that the deceptions can use N percent of the available address space, where N may be any percentage between 0 and 100, inclusive. This is referred to herein as deception density. In this way, a customer may use 100% of unallocated network IP addresses for deceptions. For example, a customer may choose any density they want as a percentage of available network addresses. In some examples, this may be done per subnet with different values.

Additionally, or alternatively, the DHCP proxy may be configured to remove deception hosts from the customer network when real hosts want a network address and the pool of network addresses available is exhausted (e.g., all of the IP addresses are assigned) and/or the deception density is exceeded. In this way, the deception service may dynamically assign network addresses to deceptions while not changing the actual number of deception hosts. Instead, multiple IP addresses are mapped to the same deception hosts.

In some examples, the programmable NAT service may be leveraged in conjunction with the DHCP proxy to dynamically NAT network traffic to and from the actual deception hosts in such a way as to map them back to the DHCP proxy assigned addresses. For example, if 50 unique DHCP addresses are mapped to a single deception host, the NAT service may be configured to map and translate the 50 entries to the single actual node on a different address. Given that malicious users or network attackers often move laterally within the network, the DHCP assigned addresses are given to the deception. This allows for deception hosts to be accessed by lateral movements using the DHCP assigned address instead of the NAT address. This ensures that accesses done without the use of a domain name service (DNS) (e.g., a simple IP pivot) are also addressed using the techniques described herein.

As previously described, the deception service may further leverage a DNS proxy. The DNS proxy may be configured to algorithmically return an assigned IP address associated with the DHCP/NAT system values assigned for hostnames that don't actually exist in the network. This makes it appear as though a host is actually present when in reality the host is not. Customers may configure the percentage of non-existent domain (NXDOMAIN), NODATA, and/or NAT IP address responses for a given hostname query. For example, an admin of a network could configured the deception service to randomly return 30-50 percent NXDOMAIN responses for non-existent hosts, while returning a NAT IP otherwise. Thus, such a configuration may increase the realism of the deception service by not always making it appear as a host is present when the host is not.

Additionally, or alternatively, stickiness can be used such that when a hostname query is answered by the service, the service may continue to return that same answer for a configurable amount of time (e.g., any number of minutes, hours, days, weeks, etc.). By configuring the deception service to implement the stickiness functionality, a non-existent host may appear real to an attacker for the configurable amount of time, such as, for example, a day. That is, if the attacker requests the same hostname within the configurable amount of time, the same answer may be returned rather than another NAT IP. In some examples, any mix of responses can be configured including leveraging machine-learned (ML) and/or artificial intelligence (AI) methods for deciding when to respond with a deception host and when to response with an indicator that the host does not exist (e.g., NXDOMAIN, NODATA, etc.). In this way, a malicious user who is doing a directory scan of the hostnames only sometimes gets an answer, which may appear to be more realistic than always answering affirmatively (e.g., always returning a host). Additionally, as previously described, a customer could configure the deception service to always affirm a non-existent hostname exists and return a deception address from the NAT service.

The DNS proxy may be configured such that it is resilient to accidental user error. As such, a dictionary system will be used to verify that a similar domain does not exist on the network that would potentially be a simple user error when entering a domain. ML and/or AI techniques may be further utilized to determine what is likely a user input error rather than a malicious users attacker tradecraft. For example, it may be common to enter an adjacent key on a querty keyboard for a domain. Additionally, or alternatively, it may be expected that a user might type in an inadvertent web address. For example, if a user was attempting to reach "www.mydomain.com", a user may inadvertently type "www.mydomian.com" or something similar. That is, the deception service may be configured to leverage some form of typosquatting or other detection methods of such scenarios.

Additionally, or alternatively, a deception may be desirable for an actual domain on the network. For example, SSH might be a common protocol an attacker interacts with. A real SSH host might be "ssh.mycompany.com." In some examples, an enterprise may set policies that say that SSH is only available over a tunneled connection. In such a scenario, the network access method may play a factor in whether to return a valid DNS result for a given host. This may be configured by the enterprise and/or network owner.

For example, if the DNS query for the host was not via a VPN or ZTNA connection, then the deception response may be returned and a deception in the pool will occupy both the NAT address and a DHCP address on the network. The DHCP proxy may be configured to ensure that a name collision of hosts does not occur.

As described herein, a deception service may be configured such that it may account for networking scanning or probing that is not sufficient to determine that a network attack is being executed. For example, a user mistyping a domain name accidentally may not trigger the deception service, as previously described. Similarly, a vulnerability scanner may scan and probe in a way that does not have prior knowledge of the systems available on a network. A scanner which uses dictionaries to try different domains would likely create an interaction with a deception. As such, the deception service may be configured to ensure that significant engagement (e.g., a threshold interaction) occurs before isolating the deception host as part of an attacker workflow.

Additionally, or alternatively, the deception service may also be configured to ensure that sufficient attacker interaction (e.g., a threshold interaction) has occurred with a deception from the pool. Once a deception has received sufficient engagement to determine something other than a network scan is occurring, then the deception may be removed from the pool and bound with the NAT and DHCP assigned addresses as if it is an actual host on the network. At this point, a new deception of the same type may be added to the pool to replace the one that was isolated for the purposes of engaging the attacker. From here, the attacker may be engaging with the deception and the normal deception detection techniques may be used to alert that an active attack is underway (e.g., send an alert to a network admin). It may be assumed that once the threshold interaction has occurred, deception technologies may take over to trap the attacker.

For example, SSH may be a common attack vector. A real SSH host in the network may be "ssh.mycompany.com." The deception service may be configured to intelligently handle typical squatting domain types of user errors so closely related domain names do not result in a deception interaction, but instead return the expected NXDOMAIN response to the user. Additionally, or alternatively, the host "ssh.finance.mycompany.com" may be an example of something a user would likely not mistype when they are trying to reach "ssh.mycompany.com." a domain that is not a squatting style error may affirmatively respond with a deception from the pool. However, this alone may not be sufficient for the deception service to remove the deception from the deception pool to complete the attacker engagement cycle. What may be required, as a threshold interaction, is a successful authentication with the SSH server that uses credentials that are legitimate within the enterprise. Once this threshold interaction is achieved, the deception service may remove the deception host from the pool and keep both the NAT and DHCP assigned addresses as part of the engagement. A new deception, of the same kind, may be added to the pool to replace the one that was isolated with the attacker. By configuring the deception service with this just-in-time (JIT) deception creation, a very small number of resources can be used to provide a full network of deception in a way that can dynamically adapt when attackers engage with a given deception. Once the attacker has completed their engagement and the deception service senses no network activity with the deception host, the deception is either spun down or returned to the pool based on the configuration (e.g., based on the deception density, number of actual hosts joining the network, and/or the like).

Take, for example, a network (e.g., an enterprise network) having host computing devices configured to host various services and/or resource for the network. A service provider may provide a deception service for deploying deceptions in the network at scale according to the techniques described herein. The deceptions may be configured as virtual machines emulating the computing resource types (or protocols associated with the computing resource types) associated with the network. The deception service may assign one or more IP addresses from a pool of available IP addresses associated with the network to the deceptions, making it appear as though a large number (e.g., hundreds, thousands, millions, and/or the like) of hosts are connected to the network, when in reality, the IP addresses map back to a small number (e.g., 5, 10, 15, etc.) of the deceptions. That is, the deception service may be configured to maintain a deception density on the network as a percentage of the hosts configured as deceptions (e.g., 70%, 80%, 90%, etc.) rather than actual hosts. The configuration of deployment of deceptions in the network may be configurable via a user of the network (e.g., a network admin) by way of one or more policies. While example numbers of deceptions and/or percentages are provided, these numbers/percentages are used for exemplary purposes and any number/percentages may be configured.

In some examples, the deception service may be configured to determine a threshold amount of computing resource types associated with the network. For example, the deception service may determine that there are 8 different computing resource types comprising different functionality and/or protocols. As such, the deception service may execute an amount of deception host computing devices to satisfy the threshold amount of computing resource types associated with the network. For example, the deception service may execute 8 deception host computing devices, each corresponding to the individual different computing resource types associated with the network. In some examples, the execution of the deception host computing devices may be dynamic in that the deception service may execute more and/or less deception host computing devices as computing resource types are added and/or dropped from the network.

The deception service may then determine a number of deceptions to emulate on the network. For example, each of the deception host computing devices may be configured to provide the functionality and/or protocols associated with the computing resource types in the network, and the deceptions may be configured to emulate various services provided by the computing resource types (e.g., providing different functionality and/or utilizing different protocols). The deception service may generate the number of deceptions to emulate on the host computing devices. As previously described, the deceptions may be associated with the computing resource types in the network. The deception service may then store a first mapping between the deceptions and the deception host computing devices. In some examples, the first mapping may be based at least in part on the protocols associated with the deceptions and/or the computing resource types associated with the deception host computing devices.

Additionally, or alternatively, the deception service may assign multiple IP addresses in the network to a single deception in the network. In some examples, the deception service may determine a percentage (e.g., a density of deceptions in the network compared to real hosts) of deceptions to emulate on the network. A policy may be leveraged by the deception service to determine the percentage of deceptions to emulate. For example, a network administrator associated with the network may configure a policy at the network indicating a density of deceptions to maintain on the network when possible, such as, for example 90 percent of the hosts being deceptions in the network and the remaining 10 percent being actual hosts in the network. That is, the deception service may maintain a pool of available IP addresses associated with the network. The deception service may assign and/or unassign the IP addresses from actual hosts as they join and/or leave the network. Additionally, or alternatively, the deception service may assign the available IP addresses to the deceptions on the network to satisfy the density of deceptions. For example, if 7 percent of IP addresses are currently being utilized by actual hosts on the network, the deception service may be configured to assign 90 percent of the IP addresses to the deceptions and leave the remaining 3 percent unassigned. Additionally, or alternatively, if the policy indicated that 95 percent of the hosts should be deceptions and 7 percent are already assigned to the actual hosts, the deception service may assign 93 percent of the IP addresses to the deceptions. In some examples, as actual hosts disconnect from the network (e.g., outside of work hours) the deception service may recycle the IP addresses previously assigned to the actual hosts to the deceptions until the threshold density is met. As actual hosts come back online, the deception service may then free up IP addresses from the deceptions as needed and assign them to the actual hosts. The deception service may store a second mapping between IP addresses in the network and the deceptions. The deception service may then deploy the deceptions to the deception host computing device based at least partly on the first mapping and/or the second mapping.

Once the deceptions have been deployed in the network, the deception service may begin monitoring the deceptions for activity. In some examples, a DNS proxy associated with the deception service may receive a request for a hostname and forward the request to the DNS server of the network. The DNS server may respond in one of many ways, such as, for example, a hostname of an actual host in the network, an NXDOMAIN response, a NODATA response. The deception service may also be configurable by a policy associated with the network, such as, for example configuring a percentage of NXDOMAIN and/or NODATA responses (e.g., a request associated with a non-existent hostname) to return a deception IP address. In some examples, the DNS proxy of the deception service may receive a response indicating that the requested host is a non-existent host in the network. Based on the configuration of the deception service, the deception service may then request a NAT IP (e.g., an IP address mapped to a deception) from the programmable NAT service. The NAT service may then get a deception from the pool of IP addresses, where the DHCP proxy is configured to manage the assigning and freeing of IP addresses to and/or from deceptions and/or actual hosts. The NAT service may then map the NAT to an IP address in the network, and return the NAT IP to the DNS proxy, where a connection may be established with a corresponding deception host computing device hosting the deception.

The deception service may then determine that the connection has been established with a first deception host computing device. The deception service may be configured to determine a first IP address associated with the connection and based on the second mapping between the IP addresses and the deceptions, the deception service may identify a first deception associated with the first IP address. From this point, the deception service may be configured to take no action until a threshold interaction (e.g., an exchange of authentication data, an exchange of authorization data, an exchange of credentials, an SSH connection, and/or the like) with the first deception has occurred. That is, the deception service may identify an interaction associated with the first deception and determine whether the interaction satisfies the threshold interaction for isolating the deception. If the interaction satisfies the threshold, the deception service may isolate the first deception from the deceptions (e.g., containerized), where the interaction may be further monitored by the deception service and/or deception techniques may be employed by the deception service to attract the attacker to interact with the deception further.

With the first deception isolated from the other deceptions, the deception service may generate a new deception being the same type as the first deception that was isolated and/or being associated with the computing resource type of the deception host on which the first deception was executing. The IP addresses that were previously assigned to the first deception may now be assigned to the new deception (and additional IP addresses to reach the deception threshold density if necessary), and the second mapping between IP addresses and deceptions is updated to reflect the new deception. The new deception may then be deployed to a deception host computing device based on the updated second mapping.

As described herein, a computing-based and/or cloud-based solution, service, and/or resource can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to ZTNA solutions and network security. For instance, the techniques described herein may allow for the prioritization of streams having different protocols (e.g., HTTP/2 and/or HTTP/3) within a multiplexed connection using ZTNA. By determining a priority value at a secure access gateway, HTTP/2 weighting data and/or HTTP/3 prioritization data may be leveraged to determine which stream to process (e.g., compute and/or networking processes) first. Additionally, by configuring an authorization chain of nodes between a client device and a target resource, the security of ZTNA solutions may be greatly increased by enforcing individual authorization requirements at each node along the authorization chain, prior to authentication at the target resource. In this way, the attack surface of a ZTNA connection may be reduced as an attacker may not be able to reach the authentication stage unless they are able to provide one or more authorization credentials at specific nodes along the network path. Further, by mapping a large number of IP addresses to a threshold number of deceptions satisfying a number of computing resource types of a network, deceptions may be deployed at scale in a network while reserving large amounts of actual compute resources. Additionally, security may be greatly increased in the network. For example, a network may be configured such that 90% of the IP addresses (or hostnames) map to deceptions, while 10% map to actual hosts in the network. In this way, an attacker must essentially play a guessing game when attacking a network. Additionally, if a threshold interaction (e.g., an authorization, an authentication, an SSH connection, and/or any other credential exchange) occurs with respect to a deception, the deception may be isolated where the attacker may continue to interact with the deception, thus delaying any subsequent attacks by the attacker. Further, following any interaction with a deception, the deception service may configure the deception to maintain the same IP address for a configurable amount of time, leading to a consistent response to a hostname request and making the deception appear as though it is a real host in the network, also increasing the security of the network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 for a secure access gateway 102 configured to assign compute and/or network prioritization to individual streams within a multiplexed session for ZTNA connecting a client device 104 associated with a remote network 106 with a target resource 108 of an enterprise network 110. The environment 100 may include one or more networks 112 in which the secure access gateway 102 may be provisioned. In some examples, the networks 112 may comprise one or more cloud network(s), wide area networks (WANs), software defined WANS (SDWANs), and/or the like. Additionally, FIG. 1 illustrates an example flow for the secure access gateway 102 to establish a multiplexed connection with one or more client devices 104, determine a gateway priority value associated with the individual streams of the multiplexed stream, and provide ZTNA access to the one or more client devices 104 to the target resource 108 while prioritizing the streams based on corresponding gateway priority values.

In some examples, the network(s) 112, the remote network 106, and/or the enterprise network 110 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the network(s) 112, such as, for example, the secure access gateway 102 and/or a DNS proxy/forwarder 114 associated with the secure access gateway 102. In some examples, the physical server(s) may host any number of virtual machines. In some examples, the physical server(s) in the enterprise network 104 may host the various network components of the enterprise network 104, such as, for example, the target resource 108.

Take, for example, a secure access gateway 102 service (or a node executing the QUIC proxy service) configured to provide client devices 104 secure remote access to a target resource 108 via ZTNA. The QUIC proxy 102 may be configured to assign compute and networking prioritization to individual streams within the HTTP/2 and/or HTTP/3 multiplexed session for ZTNA. In some examples, the secure access gateway 102 may include one or more VPN technologies, proxy technologies, and/or the like. Additionally, or alternatively, the secure access gateway 102 may employ various protocols, such as, for example, datagram transport layer security (DTLS), hypertext transfer protocol (HTTP)/2, HTTP/3, QUIC, and/or any other secure protocols. Both HTTP/2 and HTTP/3 have the ability to perform prioritization of traffic in a multiplexed stream. For example, HTTP/2 includes a built in a dependency weighting value that allocates all dependent streams an integer weight between 1 and 256 (e.g., see RFC 7540). Additionally, or alternatively, HTTP/3 includes a priority header field that allows an HTTP client to communicate preferences with respect to priority (e.g., see RFC 9218). In some examples, these prioritizations may be utilized to prioritize Zero-Trust traffic leveraging the multiplexing capabilities of a forward proxy built into both HTTP/3 (e.g., MASQUE) and HTTP/3 (e.g., CONNECT method) as described herein. As such, the forward proxy capabilities of HTTP/3 and HTTP/2 (e.g., as a fallback when HTTP/3 is not possible) may be used to deliver ZTNA via a proxy system. In some examples, the HTTP/2 protocol may be enhanced with a CONNECT-UDP method found in HTTP/3 to allow for fallback when UDP:443 cannot traverse a network, such as, for example, an enterprise that limits outbound traffic to only TCP:443. Using this approach, a multiplexed stream may be built on HTTP/2 or HTTP/3 via a forward proxy technique to implement ZTNA for a network. Traditionally, the ability to prioritize different traffic in ZTNA solutions is not possible.

Using the techniques described herein, forward proxy techniques (e.g., implemented via the secure access gateway 102) may be combined with the built-in capabilities to prioritize both HTTP/2 and HTTP/3 traffic for ZTNA. For example, using the built-in dependency weighting and/or priority information provided by HTTP/2 and/or HTTP/3, a client may indicate to the ZTNA server what the priority is for a given stream. The ZTNA server may then prioritize the compute (e.g., encryption, decryption, proxying, etc.) and/or the networking (e.g., routing, forwarding, stream encapsulation, stream decapsulation, etc.) resources to ensure that the priority traffic is processed (by both compute and/or networking resources) first, prior to the lower priority traffic. That is, those built-in priority and/or weighting information may be mapped back to network prioritization like quality of service (Qos) bits, for example, or other network prioritization schemes, as well as CPU, dataplane, etc., processing at the secure access gateway 102.

In HTTP/2 there are 1-256 possible weighting values. Using these built-in weighting values, a gateway priority value (or other form of scoring) may be determined to cover all of the multiplexed traffic that will be in a forward proxy request for a given ZTNA session. Typically, a ZTNA session may handle a subset of access requests when compared to a traditional VPN session. In other words, each of the forward proxy sessions will likely only carry a handful of access requests for a given proxy session. Therefore, it is likely that multiple ZTNA proxy sessions from a given endpoint will be carried in one or more multiplexed sessions. Using the techniques described herein, each proxy session can have a priority independent of the multiplexed streams, such that a given proxy session is treated with higher priority than another proxy session using the same concepts of weighting described for streams within a multiplexed session. That is, the secure access gateway 102, which is servicing many ZTNA sessions from many client devices 104, may prioritize real-time traffic over other traffic types that may not require the same compute and/or networking resources (e.g., web requests) such that all of the real-time traffic across the entire set of user sessions is given priority over other traffic types like web requests. In some examples, endpoint software (e.g., a target resource 108) may also do the same prioritization on the reverse network path so that the real-time traffic (or other high-priority traffic) is processed before a lower priority stream in terms of both compute and/or networking resources. Additionally, or alternatively, since the secure access gateway 102 is handling sessions from many users (e.g., client devices 104), the techniques described herein may also allow for a given user to have prioritization over another user if such a system were desirable.

At "1," the secure access gateway 102 may establish a multiplexed data stream with one or more client devices 104. For example, the secure access gateway 102 may establish a first data stream connection with one or more client devices 104 and/or a second data stream connection with the one or more client devices 104. In some examples, the first data stream connection may comprise a first HTTP protocol, such as, for example, HTTP/3. Additionally, or alternatively, the second data stream connection may comprise a second HTTP protocol, such as, for example, HTTP/2. That is, individual data streams included in the multiplexed data stream may be configured as an HTTP/2 and/or HTTP/3 connections.

At "2," once the multiplexed connection has been established with the one or more client devices 104, the secure access gateway 102 may be configured to determine an indication of prioritization data associated with the first data stream of the multiplexed data stream. In some examples, the secure access gateway 102 may determine the prioritization data based on the one or more client devices 104. That is, the one or more client devices 104 may express the prioritization data associated with the first data stream in a priority header field associated with a data packet and/or the connection. Additionally, or alternatively, the secure access gateway 102 may be configured to determine an indication of weighting data associated with the second data stream of the multiplexed data stream. In some examples, the secure access gateway 102 may determine the weighting data based on the one or more weighting bits associated with the second data stream. That is, a data packet associated with the second data stream connection may include one or more bits indicating the weighting data, as previously described.

At "3," with the weighting data and/or priority data determined for the data streams, the secure access gateway 102 may map the individual weighting data and/or priority data to gateway priority values at the secure access gateway 102. In some examples. The weighting data and/or priority data may indicate, for a given data stream of the multiplexed data stream, a type of network traffic associated with the data stream. In some examples, the secure access gateway 102 may determine a gateway priority value based on the type of network traffic. For example, the priority data associated with the first data stream may indicate that the first data stream is associated with a web request, and the weighting data associated with the second data stream may indicate that the second data stream is associated with real-time traffic. In such a scenario, the secure access gateway 102 may be configured to assign a more favorable gateway priority value to the second data stream based on the real-time traffic being prioritized over web request traffic. In some examples, the secure access gateway 102 may determine the gateway priority values based on a policy enforced at the secure access gateway 102. In some examples, the policy may indicate a gateway priority value associated with given network traffic types, where the traffic types may be determined based on the data streams, the client devices, the target resource, the weighting data, and/or the prioritization data. Additionally, or alternatively, the policy may indicate which built-in weighting values of HTTP/2 are more favorable than the prioritization data associated with HTTP/3. Additionally, or alternatively, the policy may indicate particular users and/or roles associated with particular users that should be prioritized over others.

For example, the secure access gateway 102 may determine that the prioritization data associated with the first data stream maps to a first gateway priority value, and the weighting data associated with the second data stream maps to a second gateway priority value. In some examples, a gateway priority value may be configured as an integer, and the secure access gateway 102 may be configured to prioritize one stream over another stream based on the associated gateway priority value. Additionally, or alternatively, a gateway priority value may be represented by one or more QoS bits. Consider such an example where the prioritization data associated with the first stream maps to a first gateway priority value of 2 and the weighting data associated with the second stream maps to a second gateway priority value of 5. The secure access gateway 102 may determine that the second gateway priority value is more favorable than the first gateway priority value based on the second gateway priority value being greater than the first gateway priority value.

Additionally, or alternatively, the secure access gateway 102 may comprise a priority datastore 116, where the gateway priority values may be stored. For example, the secure access gateway 102 may store a first mapping between the first stream (and/or the prioritization data) and the first gateway priority value and/or a second mapping between the second stream (and/or the weighting data) and the second gateway priority value in the datastore 116. In some examples, the secure access gateway 102 may send indications of the gateway priority value(s) to associated target resource(s) 108 and/or the client devices 104, where each respective device may utilize the gateway priority values to prioritize the streams (in the reverse direction for example).

At "4," based on the second gateway priority value being more favorable than the first gateway priority value, the secure access gateway 102 may process (e.g., performing an encryption process, a decryption process, a proxy process, a routing process, a forwarding process, an encapsulation process, a decapsulation process, and/or any other form of compute and/or network process) the second data stream prior to processing the first data stream. The secure access gateway 102 may determine a target resource associated with a given data stream of the multiplexed data stream. For example, the secure access gateway 102 may determine a target resource 108 associated with the second data stream and establish a third data stream connection between the secure access gateway 102 and the target resource 108. In some examples, the third data stream may comprise a QUIC protocol, a UDP protocol, and/or a transmission control protocol (TCP). The secure access gateway 102 may then be configured to process and/or transmit network traffic associated with the second data stream to the target resource 108 prior to processing and/or transmitting network traffic associated with the first data stream to the target resource and/or an additional target resource. As previously described, the secure access gateway 102 may determine one or more QoS bits that indicate and/or represent the gateway priority value and send the one or more QoS bits to the target resource 108, such that network traffic traveling in the opposite direction (e.g., from the target resource and toward the client device) is prioritized in the same manner.

Additionally, or alternatively, the ZTNA techniques described herein may be implemented via multiple secure access gateways 102, configured as an authorization chain, for example, as described with respect to FIGS. 2A-2C below.

Figure 2A:
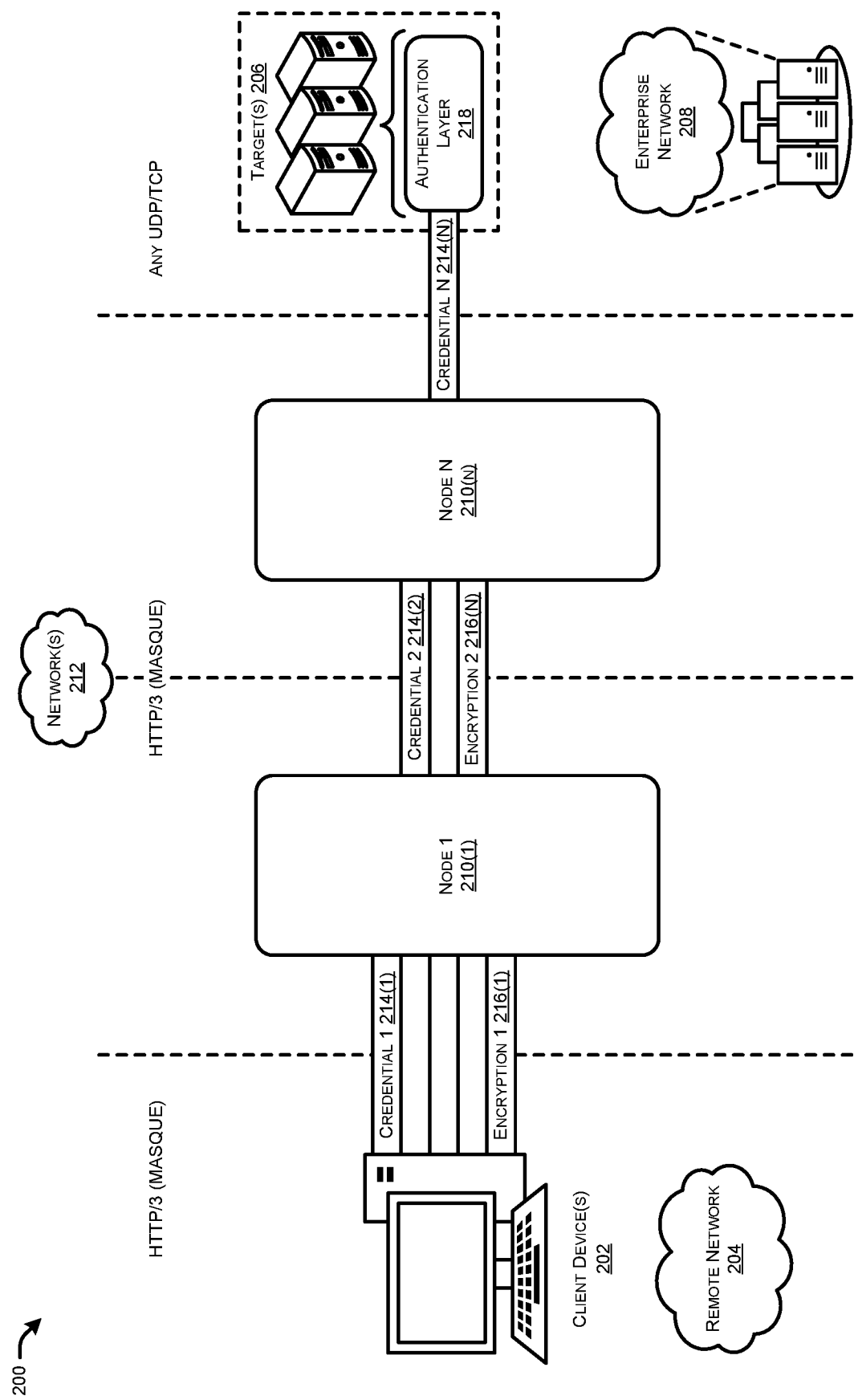
FIGS. 2A-2C illustrate system-architecture diagrams of example environments for a client computing device to establish a ZTNA connection with a target resource of a network, such as, for example, an enterprise network, via one or more authorization nodes (e.g., network proxies, network relays, and/or the like) configured as an authorization chain.
Figure 2B:
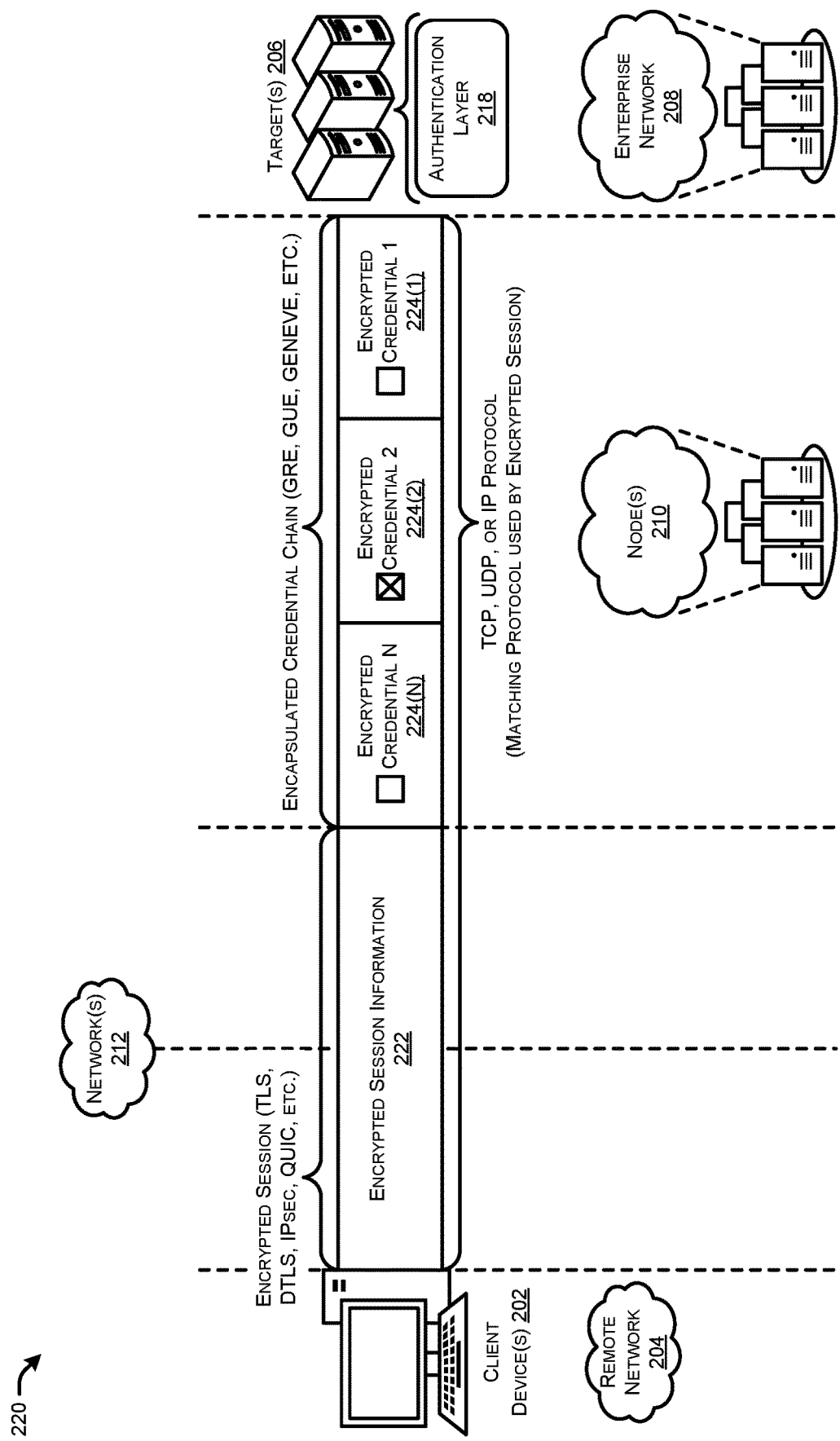
Figure 2C:
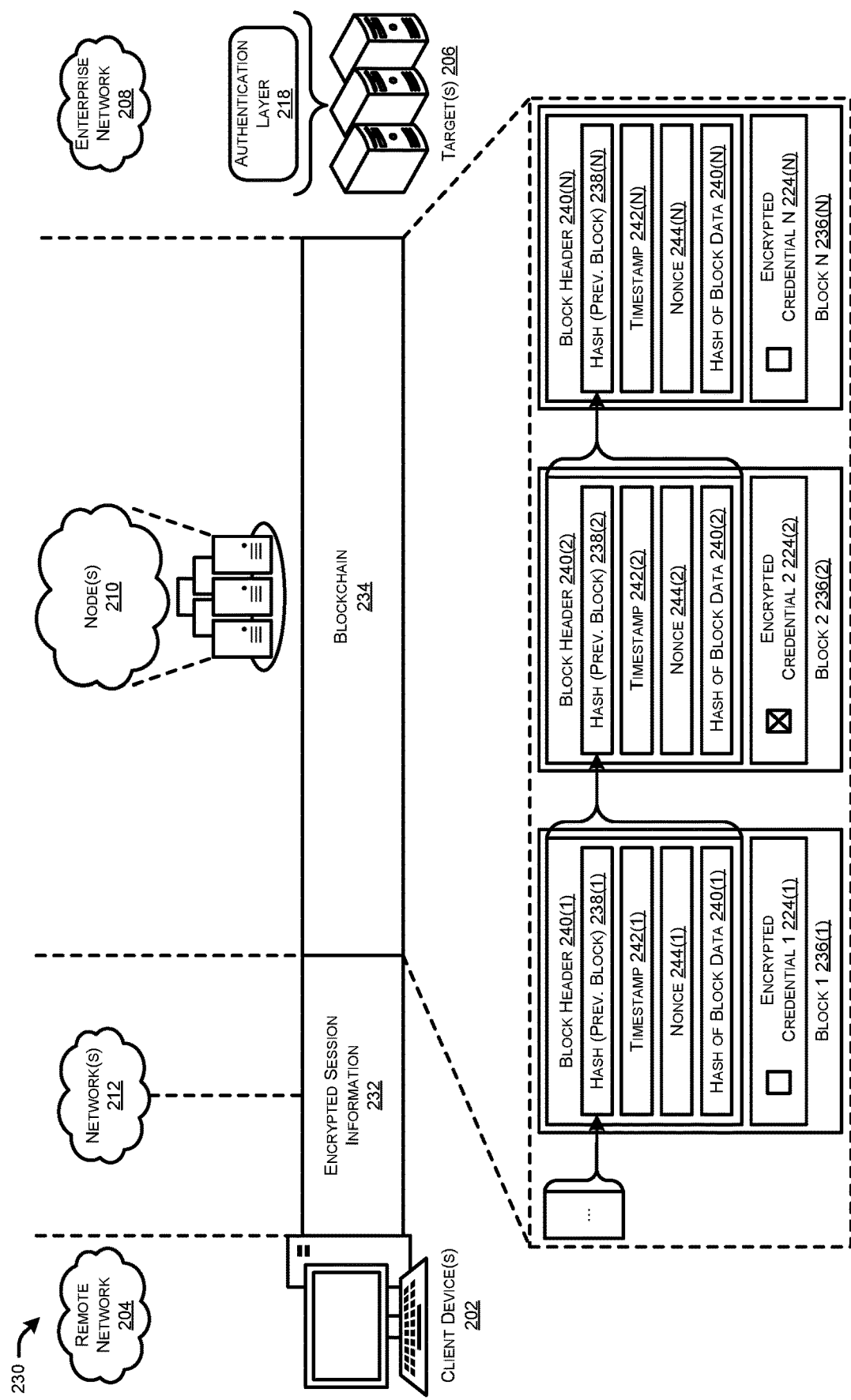

FIGS. 2A-2C illustrate system-architecture diagrams of example environments 200, 220, and 230 for a client computing device 202 in a remote network 204 to establish a ZTNA connection with a target resource 206 of a network, such as, for example, an enterprise network 208, via one or more authorization nodes 210(1)-(N) (e.g., network proxies, network relays, and/or the like) configured as an authorization chain, where N may be any integer greater than 1. In some examples, the nodes 210 may be deployed across one or more networks 212.

In some examples, the network(s) 212, the remote network 204, and/or the enterprise network 208 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the network(s) 212, such as, for example, the nodes 210. In some examples, the physical server(s) may host any number of virtual machines. In some examples, the physical server(s) in the enterprise network 104 may host the various network components of the enterprise network 104, such as, for example, the target resource 206.

As described herein, a client computing device 202 may establish a ZTNA connection with a target resource 206 of an enterprise network 208, for example, via one or more authorization nodes 210 (e.g., network proxies, network relays, and/or the like) configured as an authorization chain. For example, one or more relays may be used to effectively route traffic to a proxy node and/or a VPN node in such a way that each relay authorizes connecting to the next stage. In some examples, such a method uses relays and authorization token chains in order to allow access to the next hop in the network. Various implementations utilizing relays and/or token chains are described in more detail with respect to FIGS. 2A-2C.

FIG. 2A illustrates a system-architecture diagram of an example environment 200 for the client computing device 202 to establish a ZTNA connection with the target resource 206 of the enterprise network 208, via the one or more authorization nodes 210 configured as an authorization chain. In some examples, the MASQUE protocol may be leveraged to create an authorization chain for the client device 202 to access the target resource 206. Take for example, a two-stage authorization chain (e.g., two nodes 210(1) and 210(N) requiring authorization). A first stage may be a first node 210(1) configured as a relay that requires a first authorization credential 214(1) (also referred to herein as an authorization token, a bearer token, etc.), such as, for example, a privacy pass token. This first node 210(1) may enforce course-grained device-level access policies before proceeding to the next stage in the chain. If the first stage in the authorization chain is successfully traversed, a second stage may require a second authorization credential 214(2). For example, the second stage may be a second node 210(N) configured as a proxy that requires the second authorization credential 214(2), such as, for example, a client certificate. In order to relay the session to the target destination 206, the second node 210(N) may require the client certificate to be presented. In such a scenario, the resource 206 access grant is done via a different token at the second stage than at the first stage. Thus, the token chain above contains two links that are to be satisfied first by the privacy pass, and then the client certificate. This implementation of the authorization chain is referred to herein as onion layer encapsulation.

By configuring an authorization chain in this way, an unauthorized device cannot even reach the second node 210(N) configured as the proxy to the target resource 206. Once the proxy node 210(N) is reached, only an authorized user can access the target resource 206. In some examples, a packet may be encapsulated with encryption layers 216(1)-(N) corresponding to the authorization stages, where each layer 216 in the sequence may be encrypted and may carry the authentication credential 214 needed to continue to the next stage. That is, each layer 216 may have its own encryption and authentication components for that layer 216. This may be referred to herein as onion routing, where each layer 216 is conceptualized as an onion layer. Each layer 216 in the onion may be exposed if a policy is met at the prior layer 216 (e.g., a second layer 216(N) comprising the client certificate may be exposed following satisfaction of the first stage by presenting the first layer 216(1) comprising the privacy pass token). Ultimately, the onion layers may be traversed until the core is reached (e.g., the target resource 206) only after satisfying the policies needed at each outer layer.

As previously described, the encapsulated packet may include two layers 216, a first outer layer 216(1) comprising a privacy pass token and a second inner layer 216(N) comprising the client certificate. Additionally, a third innermost layer may be conceptualized. For example, the third inner layer may correspond to single sign on (SSO) user credentials 214(N) for accessing the target resource 206. That is, once the first two stages are satisfied by the corresponding authorization credentials 214(1), 214(2), a third and final stage may be reached at the target resource 206, where a user may be required to provide SSO user credentials 214(N) to access the target resource 206. In such an example, all three stages of the authorization chain would need to be comprised in order for an unauthorized user to reach the target resource 206. While example authorization credentials 214 are described, any non-user-interactive credential (e.g., a privacy pass token, a client certificate, and/or any other type of authorization credential) and/or any user interactive credential (e.g., SSO user credentials, biometric credentials, etc.) may be leveraged at any stage in an authorization chain.

Take, for example, a user of a client computing device 202 attempting to establish a ZTNA connection to a target resource 206. The network path between the client computing device 202 and the target resource 206 may comprise an authorization chain including one or more nodes 210 comprising authorization requirements that are to be satisfied to connect to the target resource 206. The nodes 210 may be configured as a proxy node, a relay node, and/or the like. In some examples, the client computing device 202 may generate a packet encapsulated with encryption layers 216(1)-(N) (where N may be any integer greater than 1) of authorization credentials 214(1)-(N) configured to satisfy the authorization requirements associated with the nodes 210, as previously described in the onion layer encapsulation implementation of the authorization chain.

The client computing device 202 may be configured to generate a packet indicating a request to connect to the target resource 206. In some examples, the client computing device 202 may identify the authorization chain based at least in part on the target resource 208. That is, the client computing device may identify the individual nodes 210 and the authorization requirements that are associated with the individual nodes 210. Once the authorization chain has been identified, the client computing device 202 may then identify the authorization credentials 214 that will be utilized to satisfy the authorization requirements associated with the nodes 210 of the authorization chain. In some examples, the authorization credentials 214 may be stored on the client computing device 202 and/or stored remotely in a datastore that is accessible via the networks 212 by the client computing device 202.

The client computing device 202 may also be configured to generate an encapsulated packet by encapsulating the packet that was previously generated with individual encryption layers 216(1)-(N) comprising the authorization credentials 214(1)-(N). In some examples, the client computing device may determine an order of the nodes 210 in the authorization chain (e.g., an order of the nodes that will be traversed on the network path to the target resource). The client computing device 202 may utilize the order of the nodes 210 to generate the encapsulated packet by encapsulating the packet with the encryption layers 216 according to the order of the nodes 210. That is, the outermost encryption layer 216(1) of the encapsulated packet may comprise a first authorization credential 214(1) utilized to satisfy the first authorization requirement associated with the first node 210(1) in the authorization chain that will be reached. Additionally, or alternatively, the innermost encryption layer 216(N) of the encapsulated packet may comprise a second authorization credential 216(2) utilized to satisfy the last authorization requirement associated with the last node 210(N) in the authorization chain that will be reached prior to the target resource 206.

With the encapsulated packet generated, the client computing device 202 may be configured to send the encapsulated packet to the target resource 206 via the authorization chain of nodes 210. For example, the client computing device 202 may send the encapsulated packet to the first node 210(1) of the authorization chain. The first node 210(1) may consume the authorization credential associated with the outermost encryption layer 216(1). That is, the first node 210(1) may be configured to decrypt the outermost encryption layer 216(1) and access the authorization credential 214(1) comprised therein. In some examples, the consumption of the authorization credential 214(1) may result in removal of the outermost encryption (or encapsulation) layer 216(1) by the first node 210(1), leaving the second encryption layer 216(N) as the new outermost encryption layer after consumption. Additionally, or alternatively, an authorization credential 214 associated with a given encryption layer 216 may be configured as interactive authorization credential 214 (e.g., requiring interaction of some kind by the user of the client computing device) or a non-interactive authorization credential 214 (e.g., a privacy pass, a client certificate, and/or any other form of authorization token). In examples where an authorization credential 214 is configured as an interactive authorization credential 214, the corresponding node 210 may communicate instructions for satisfying the interactive authorization credential 214 back to the client computing device 202.

Following traversal of the authorization chain of nodes 210, and the satisfaction of the corresponding authorization requirements at each, an authentication layer 218 may be reached and the target resource 206 may send a request to authenticate the user associated with the client computing device 202 with the target resource 206. The client computing device 202 may display the request for authentication prompting the user for the necessary input. Once the user provides the input of authentication credentials 214(N) to the client computing device 202, the client computing device 202 may send the authentication response including authentication credentials 214(N) to the target resource 206, where the user may be authenticated with the target resource 206, and a connection may be established.

FIG. 2B illustrates another system-architecture diagram of an example environment 220 for the client computing device 202 to establish a ZTNA connection with the target resource 206 of the enterprise network 208, via the one or more authorization nodes 210 configured as an authorization chain.

In some examples, the authorization chain may be configured with a single encryption layer (e.g., the encryption session information 222) between the target resource 206 and the client device 202. In such an example, encrypted authorization credentials 224(1)-(N) may be inline with the flow at the beginning of the traffic as metadata. This may be achieved using various encapsulation protocols such as, for example, Generic Network Virtualization Encapsulation (GENEVE), Generic Routing Encapsulation (GRE), Generic UDP encapsulation (GUE), the Proxy Protocol, and the like. This implementation of the authorization chain is referred to herein as single encryption inline encapsulation.

In such a configuration, each authorization credential (also referred to herein as tokens) 224 may be carried in as a link in the chain. In some examples, there may be no requirement to sequentially place the authorization tokens 224 in order (in contrast to the onion routing example described with respect to FIG. 2A, where the packet was encapsulated with layers in an order corresponding to the authorization chain). Additionally, or alternatively, it may provide computational improvements to sequentially order the authorization tokens 224, avoiding analyzing the entire chain for a matching token 224. Each token 224 may be encrypted in a way that only the node 210 associated with the token 224 (e.g., the node 210 enforcing the authorization stage) can decrypt the token 224. This encryption may be performed using any encryption protocols, such as, for example, hybrid public key encryption (HPKE) and the like.

In some examples, an authorization credential 224 (e.g., a bearer token) may not be presented in-band with the flow. In such a scenario, the protocol can indicate that the token 224 will be received out of band and how to associate the flow with a given out of band authentication and authorization. As noted, tokens 224 may not be required to be configured in a sequential order. Additionally, as the tokens 224 are processed, they may be removed by the node 210 in the authorization chain that processed that token 224 from the chain of tokens 224. Additionally, or alternatively, a bit in the payload may be configured to be modified by the node 210 in the authorization chain that processed that token 224 to indicate that the token 224 has been expended, as illustrated in FIG. 2B (e.g., the "X" next to encrypted credential 2 224(2)).

The client computing device 202 may be configured to determine the nodes 210 along a network path (e.g., an authorization chain of nodes 210) between the client computing device 220 and a target resource 206 based on the target resource 206. Each of the nodes 210 may comprise an authorization requirement that is required to be satisfied prior to proceeding to the next node 210. Once the nodes 210 along the network path have been identified, the client computing device 202 may then identify the authorization credentials 224 that will be utilized to satisfy the authorization requirements associated with the nodes 210 along the network path. In some examples, the authorization credentials 224 may be stored on the client computing device 202 and/or stored remotely in a datastore that is accessible by the client computing device 202 via the one or more networks 212.

The client computing device 202 may also be configured to generate a packet indicating a request to connect to the target resource 206. In some examples, the packet may include the authorization credentials 224 corresponding to the authorization requirements. Additionally, or alternatively, each authorization credential 224 may be encrypted using a type of encryption corresponding to the node 210 comprising the associated authorization requirement. That is, an authorization credential (e.g., 224(2)) may be encrypted in a way such that only the node 210(1) (not pictured in FIG. 2B) comprising the corresponding authorization requirement may be configured to decrypt the corresponding authorization credential 224(2).

With the packet generated, the client computing device 202 may be configured to send the packet to the target resource 206 via the nodes 210 along the network path. For example, the client computing device 202 may send the packet to the first node 210 of the nodes 210. The first node 210 may consume the authorization credential 224 configured to satisfy the corresponding authorization requirement. That is, the first node 210 may be configured to decrypt and access the authorization credential 224(2) comprised therein. In some examples, the consumption of the authorization credential 224(2) may result modifying at least a bit in the packet indicating that the authorization credential has been expended. Additionally, or alternatively, a subsequent node 210 receiving the packet may check for the bit indicating that the previous authorization credential 224(2) has been expended prior to decrypting the next authorization credential 224. Additionally, or alternatively, an authorization credential 224 associated may be configured as interactive authorization credential 224 (e.g., requiring interaction of some kind by the user of the client computing device 202) or a non-interactive authorization credential 224 (e.g., a privacy pass, a client certificate, and/or any other form of authorization token). In examples where an authorization credential 224 is configured as an interactive authorization credential 224, the corresponding node 210 may communicate instructions for satisfying the interactive authorization credential 224 back to the client computing device 202.

Following traversal of the nodes 210 along the network path, and the satisfaction of the corresponding authorization requirements at each, an authentication layer 218 may be reached and the target resource 206 may send a request to authenticate the user associated with the client computing device 202 with the target resource 206. The client computing device 202 may display the request for authentication prompting the user for the necessary input. Once the user provides the input of authentication credentials to the client computing device, the client computing device 202 may send the authentication response including authentication credentials to the target resource 206, where the user may be authenticated with the target resource 206, and a connection may be established.

FIG. 2C illustrates another system-architecture diagram of an example environment 230 for the client computing device 202 to establish a ZTNA connection with the target resource 206 of the enterprise network 208, via the one or more authorization nodes 210 configured as an authorization chain.

As similarly described with respect to FIG. 2B, the authorization chain may be configured with a single encryption layer (e.g., the encryption session information 232) between the target resource 206 and the client device 202. In some examples, the token chain as described with respect to FIG. 2B may be implemented using blockchain 234 technologies. That is, the encrypted credentials 224 may be stored in one or more blocks 236 of a ledger associated with a blockchain 234 network. In some examples, each block 236 may store an encrypted token 224, and the blocks 236 may be required to satisfy a policy requirement of a given node in order to traverse to the next node 210 in the authorization chain. Additionally, or alternatively, each block 236 may store the hash of the previous block 238, such that a given block 236 can verify that the policy requirement at the previous node 210 was satisfied by computing the hash of the previous block 238. Additionally, or alternatively, each block 236 may comprise a block header 240 including the hash of the previous block 238, a timestamp 242 associated with the block 236, a nonce 244 associated with the block 236, and/or a hash of the block data 246. This implementation of the authorization chain is referred to herein as single encryption blockchain encapsulation.

In some examples, there may be no requirement to sequentially place the authorization tokens 224 in the blocks 236 in order (in contrast to the onion routing example described with respect to FIG. 2A, where the packet was encapsulated with layers in an order corresponding to the authorization chain). Additionally, or alternatively, it may provide computational improvements to sequentially order blocks 236 and/or the authorization tokens 224, avoiding analyzing all of the blocks 236 for a matching token 224. Each token 224 may be encrypted in a way that only the node 210 associated with the token 224 (e.g., the node 210 enforcing the authorization stage) can decrypt the token 224. This encryption may be performed using any encryption protocols, such as, for example, hybrid public key encryption (HPKE) and the like.

In some examples, an authorization credential 224 (e.g., a bearer token) may not be presented in-band with the flow. In such a scenario, the protocol can indicate that the token 224 will be received out of band (e.g., in association with the blockchain 234) and how to associate the flow with a given out of band authentication and authorization. Additionally, as the tokens 224 are processed, they may be removed by the node 210 in the authorization chain that processed that token 224 from the chain of tokens 224. Additionally, or alternatively, a bit in the payload may be configured to be modified by the node 210 in the authorization chain that processed that token 224 to indicate that the token 224 has been expended, as illustrated in FIG. 2C (e.g., the "X" next to encrypted credential 2 224(2)).

Take, for example the client computing device 202 requesting to establish a connection with the target resource 206. The client computing device 202 may be configured to determine the nodes 210 along a network path (e.g., an authorization chain of nodes 210) between the client computing device 220 and a target resource 206 based on the target resource 206. Each of the nodes 210 may comprise an authorization requirement that is required to be satisfied prior to proceeding to the next node 210. Once the nodes 210 along the network path have been identified, the client computing device 202 may then identify the authorization credentials 224 that will be utilized to satisfy the authorization requirements associated with the nodes 210 along the network path. In some examples, the authorization credentials 224 may be stored on the client computing device 202 and/or stored remotely in a datastore that is accessible by the client computing device 202 via the one or more networks 212.

As previously described, the client computing device 202 may also be configured to store the identified authorization credentials 224 in blocks 236 of a ledger associated with a blockchain network 234. The client computing device 202 may then generate a packet indicating a request to connect to the target resource 206. In some examples, the packet may include indications of addresses of the blocks 236 associated with the blockchain network 234. That is, individual authorization credentials 224 may be stored in individual blocks 236 of a blockchain network 234 and may be accessed via the addresses. Additionally, or alternatively, each authorization credential 224 may be encrypted using a type of encryption corresponding to the node 210 comprising the associated authorization requirement. That is, an authorization credential 224 may be encrypted in a way such that only the node 210 comprising the corresponding authorization requirement may be configured to decrypt the corresponding authorization credential, as previously described with respect to FIG. 2B.

With the packet generated, the client computing device 202 may be configured to send the packet to the target resource 206 via the nodes 210 along the network path. For example, the client computing device 202 may send the packet to the first node 210 of the nodes 210. The first node may consume the authorization credential 224 configured to satisfy the corresponding authorization requirement. That is, the first node 210 may be configured to decrypt and access the authorization credential comprised therein. In some examples, a node 210 may modify the hash of a block 240 to indicate that the corresponding authorization credential 224 has been expended, and a subsequent node 210 may utilize the next block 236 to confirm that the previous authorization credential 224 has been expended. For example, the node 210 may check the block header 240 for a hash of the previous block 238 to determine that the previous authorization credential 224 has been expended. Additionally, or alternatively, an authorization credential 224 associated may be configured as interactive authorization credential 224 (e.g., requiring interaction of some kind by the user of the client computing device) or a non-interactive authorization credential 224 (e.g., a privacy pass, a client certificate, and/or any other form of authorization token). In examples where an authorization credential 224 is configured as an interactive authorization credential 224, the corresponding node 210 may communicate instructions for satisfying the interactive authorization credential 224 back to the client computing device 202.

Following traversal of the nodes 210 along the network path, and the satisfaction of the corresponding authorization requirements at each, an authentication layer 218 may be reached and the target resource 206 may send a request to authenticate the user associated with the client computing device 202 with the target resource 206. The client computing device 202 may display the request for authentication prompting the user for the necessary input. Once the user provides the input of authentication credentials to the client computing device 202, the client computing device 202 may send the authentication response including authentication credentials to the target resource 206, where the user may be authenticated with the target resource 206, and a connection may be established between the client device 202 and the target resource 206.

Figure 3:
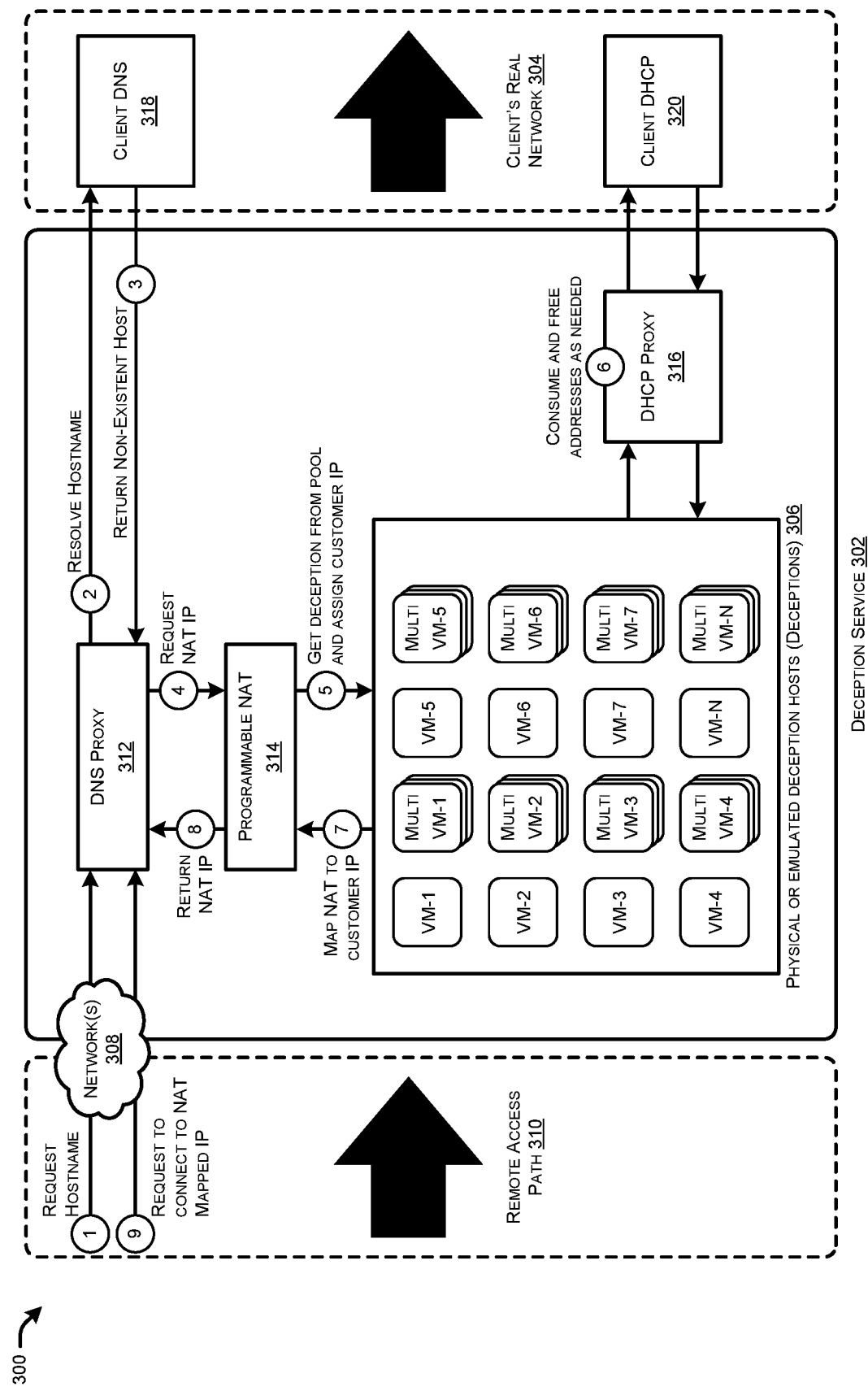
FIG. 3 illustrates a system-architecture diagram of an example environment for a deception service associated with a network to deploy deceptions at scale in the network.

FIG. 3 illustrates a system-architecture diagram of an example environment for a deception service 302 associated with a network 304 (e.g., a client network, an enterprise network, and/or the like) to deploy deceptions 306 at scale in the network 304. In some examples, the deception service 302 may be deployed in various ways and in association with various network(s) 308. For example, the deception service 302 may be offered by a service provider and utilized by one or more networks 304 configured as a cloud computing network, a SASE network, a ZTNA network, and/or the like. Additionally, FIG. 3 illustrates an example flow for the deception service 302 to deploy the deceptions 306 at scale in a network 304.

In some examples, a deception service 302 may utilize and/or be comprised of a DNS proxy 312 configured to make it appear as though many hosts are joining the network 304, a programmable NAT service 314 configured to dynamically translate network traffic to and from deception hosts 306, and/or a DHCP monitor/proxy 316 configured to consume and free IP addresses in the network 304 as needed. The deception services 302 and/or the components thereof are described in more detail below.

In some examples, the network(s) 308, the remote access path 310, and/or the client network 304 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the network(s) 308, such as, for example, the deception service 308, the DNS proxy 312 associated with the deception service 302, the programmable NAT service 314 associated with the deception service 302, and/or the DHCP proxy 316 associated with the deception service 302. In some examples, the physical server(s) may host any number of virtual machines. In some examples, the physical server(s) in the client network 304 may host the various network components of the client network 304, such as, for example, the client DNS 318, and/or the client DHCP 320.

The deception service 302 may be configured such that a small number of deception hosts 306 will actually exist. In some examples, the deception service 302 may configure the deception hosts 306 with enough hosts to cover all of the operating systems (OS) and/or components typically found in the networks 304 datacenter (e.g., an enterprise datacenter), such as, for example, an active directory, a domain server, a web server, a directory server, an application server, a file server, an OS server, a database server, and/or the like (illustrated as VM-1 through VM-N and/or Multi VM-1 through Multi VM-N). For example, there would be a small pool of active directory server deceptions 306. Initially, a configurable amount of each deception type will be spun up on physical, virtual and/or container hosts. In some examples, each of these options may be policy driven (e.g., the configurable amount of each deception type, type of host, etc.). Such a configuration may be driven by the deception service provider (e.g., a SASE vendor) rather than by the individual customers using the deception service 302. An option could be available to allow custom deceptions 306 that a customer would be able to modify to match their enterprise network 304 and put these in a customer-specific pool. For example, a customer might want to deploy an active directory deception 306 that more closely matched their enterprise network 304 configuration. Additionally, or alternatively, deceptions 306 may be a mix of actual systems and emulations. In some examples, where possible, emulations of protocols are used instead of hosting the actual service. For example, an SSH emulator would be sufficient to attract an attacker, while at the same time produce a low false positive detection rate, thus saving on compute resources. Further, physical hosts may be used and reserved for physical host types of attacks that can't be virtualized or containerized due to a technical reason.

As previously described, the deception service 302 may leverage a DHCP proxy 316 (or instances thereof) and/or a programmable NAT service 314. Once the initial deceptions 306 are deployed, they may interact with the DHCP proxy 316. The DHCP proxy 316 instances may proxy DHCP request to customer networks 304 (bidirectionally). In some examples, policies may allow a customer to choose how many deceptions they want to emulate on the network using the DHCP proxy 316. Additionally, or alternatively, the DHCP proxy 316 may be configured such that it will look like many hosts are joining the customer's network 304, when in reality all of the hosts map back to the small set of actual deceptions 306. The percentage of unused network addresses may be configurable such that the deceptions 306 can use N percent of the available address space, where N may be any percentage between 0 and 100, inclusive. This is referred to herein as deception density. In this way, a customer may use 100% of unallocated network IP addresses for deceptions 306. For example, a customer may choose any density they want as a percentage of available network addresses. In some examples, this may be done per subnet with different values.

Additionally, or alternatively, the DHCP proxy 316 may be configured to remove deception hosts 306 from the customer network 304 when real hosts want a network address and the pool of network addresses available is exhausted (e.g., all of the IP addresses are assigned) and/or the deception density is exceeded. In this way, the deception service 302 may dynamically assign network addresses to deceptions 306 while not changing the actual number of deception hosts 306. Instead, multiple IP addresses are mapped to the same deception hosts 306.

In some examples, the programmable NAT service 314 may be leveraged in conjunction with the DHCP proxy 316 to dynamically NAT network traffic to and from the actual deception hosts 306 in such a way as to map them back to the DHCP proxy 316 assigned addresses. For example, if 50 unique DHCP addresses are mapped to a single deception host 306, the NAT service may be configured to map and translate the 50 entries to the single actual node on a different address. Given that malicious users or network attackers often move laterally within the network, the DHCP assigned addresses are given to the deception 316. This allows for deception hosts 306 to be accessed by lateral movements using the DHCP assigned address instead of the NAT address. This ensures that accesses done without the use of a domain name service (DNS) 318 (e.g., a simple IP pivot) are also addressed using the techniques described herein.

As previously described, the deception service 302 may further leverage a DNS proxy 312. The DNS proxy 312 may be configured to algorithmically return an assigned IP address associated with the DHCP/NAT system values assigned for hostnames that don't actually exist in the network 304. This makes it appear as though a host is actually present when in reality the host is not. Customers may configure the percentage of non-existent domain (NXDOMAIN), NODATA, and/or NAT IP address responses for a given hostname query. For example, an admin of a network could configure the deception service to randomly return 30-50 percent NXDOMAIN responses for non-existent hosts, while returning a NAT IP otherwise. Thus, such a configuration may increase the realism of the deception service 302 by not always making it appear as a host is present when the host is not. While example values of 30-50 percent are provided herein, the percentages may be any percentage between 0 and 100, inclusive.

Additionally, or alternatively, stickiness can be used such that when a hostname query is answered by the deception service 302, the deception service 302 may continue to return that same answer for a configurable amount of time (e.g., any number of minutes, hours, days, weeks, etc.). By configuring the deception service 302 to implement the stickiness functionality, a non-existent host may appear real to an attacker for the configurable amount of time, such as, for example, a day. That is, if the attacker requests the same hostname within the configurable amount of time, the same answer may be returned rather than another NAT IP. In some examples, any mix of responses can be configured including leveraging machine-learned (ML) and/or artificial intelligence (AI) methods for deciding when to respond with a deception host and when to response with an indicator that the host does not exist (e.g., NXDOMAIN, NODATA, etc.). In this way, a malicious user who is doing a directory scan of the hostnames only sometimes gets an answer, which may appear to be more realistic than always answering affirmatively (e.g., always returning a host). Additionally, as previously described, a customer could configure the deception service 302 to always affirm a non-existent hostname exists and return a deception address from the NAT service 314.

The DNS proxy 312 may be configured such that it is resilient to accidental user error. As such, a dictionary system will be used to verify that a similar domain does not exist on the network that would potentially be a simple user error when entering a domain. ML and/or AI techniques may be further utilized to determine what is likely a user input error rather than a malicious users attacker tradecraft. For example, it may be common to enter an adjacent key on a querty keyboard for a domain. Additionally, or alternatively, it may be expected that a user might type in an inadvertent web address. For example, if a user was attempting to reach "www.mydomain.com", a user may inadvertently type "www.mydomian.com" or something similar. That is, the deception service 302 may be configured to leverage some form of typosquatting or other detection methods of such scenarios.

Additionally, or alternatively, a deception 306 may be desirable for an actual domain on the network 304. For example, SSH might be a common protocol an attacker interacts with. A real SSH host might be "ssh.mycompany.com." In some examples, an enterprise may set policies that say that SSH is only available over a tunneled connection. In such a scenario, the network access method may play a factor in whether to return a valid DNS result for a given host. This may be configured by the enterprise and/or network owner. For example, if the DNS query for the host was not via a VPN or ZTNA connection, then the deception response may be returned and a deception 306 in the pool will occupy both the NAT address and a DHCP address on the network 304. The DHCP proxy 316 may be configured to ensure that a name collision of hosts does not occur.

As described herein, a deception service 302 may be configured such that it may account for networking scanning or probing that is not sufficient to determine that a network attack is being executed. For example, a user mistyping a domain name accidentally may not trigger the deception service 302, as previously described. Similarly, a vulnerability scanner may scan and probe in a way that does not have prior knowledge of the systems available on a network. A scanner which uses dictionaries to try different domains would likely create an interaction with a deception 306. As such, the deception service 302 may be configured to ensure that significant engagement (e.g., a threshold interaction) occurs before isolating the deception host 306 as part of an attacker workflow.

Additionally, or alternatively, the deception service 302 may also be configured to ensure that sufficient attacker interaction (e.g., a threshold interaction) has occurred with a deception 306 from the pool. Once a deception 306 has received sufficient engagement to determine something other than a network scan is occurring, then the deception 306 may be removed from the pool and bound with the NAT and DHCP assigned addresses as if it is an actual host on the network 304. At this point, a new deception 306 of the same type may be added to the pool to replace the one that was isolated for the purposes of engaging the attacker. From here, the attacker may be engaging with the deception 306 and the normal deception detection techniques may be used to alert that an active attack is underway (e.g., send an alert to a network admin). It may be assumed that once the threshold interaction has occurred, deception technologies may take over to trap the attacker.

For example, SSH may be a common attack vector. A real SSH host in the network may be "ssh.mycompany.com." The deception service 302 may be configured to intelligently handle typical squatting domain types of user errors so closely related domain names do not result in a deception interaction, but instead return the expected NXDOMAIN response to the user. Additionally, or alternatively, the host "ssh.finance.mycompany.com" may be an example of something a user would likely not mistype when they are trying to reach "ssh.mycompany.com." a domain that is not a squatting style error may affirmatively respond with a deception 306 from the pool. However, this alone may not be sufficient for the deception service 302 to remove the deception 306 from the deception pool to complete the attacker engagement cycle. What may be required as a threshold interaction is a successful authentication with the SSH server that uses credentials that are legitimate within the enterprise. Once this threshold interaction is achieved, the deception service may remove the deception host 306 from the pool and keep both the NAT and DHCP assigned addresses as part of the engagement. A new deception 306, of the same kind, may be added to the pool to replace the one that was isolated with the attacker. By configuring the deception service 302 with this just-in-time (JIT) deception creation, a very small number of resources can be used to provide a full network of deception 306 in a way that can dynamically adapt when attackers engage with a given deception 306. Once the attacker has completed their engagement and the deception service 302 senses no network activity with the deception host 306, the deception 306 is either spun down or returned to the pool based on the configuration (e.g., based on the deception density, number of actual hosts joining the network, and/or the like).

Take, for example, a client network 304 (e.g., an enterprise network) having host computing devices configured to host various services and/or resource for the network 304. A service provider may provide a deception service 302 for deploying deceptions 306 in the network 304 at scale according to the techniques described herein. The deceptions 306 may be configured as virtual machines emulating the computing resource types (or protocols associated with the computing resource types) associated with the network 304. The deception service 302 may assign one or more IP addresses from a pool of available IP addresses associated with the network to the deceptions 306, making it appear as though a large number (e.g., hundreds, thousands, millions, and/or the like) of hosts are connected to the network 304, when in reality, the IP addresses map back to a small number (e.g., 5, 10, 15, etc.) of the deceptions 306. That is, the deception service 302 may be configured to maintain a deception density on the network 304 as a percentage of the hosts configured as deceptions 306 (e.g., 70%, 80%, 90%, etc.) rather than actual hosts. The configuration of deployment of deceptions 306 in the network 304 may be configurable via a user of the network (e.g., a network admin) by way of one or more policies. While example numbers of deceptions 306 and/or percentages are provided, these numbers/percentages are used for exemplary purposes and any number/percentages may be configured.

In some examples, the deception service 302 may be configured to determine a threshold amount of computing resource types associated with the network 304. For example, the deception service 302 may determine that there are 8 different computing resource types comprising different functionality and/or protocols. As such, the deception service 302 may execute an amount of deception host computing devices 306 to satisfy the threshold amount of computing resource types associated with the network. For example, the deception service 302 may execute 8 deception host computing devices 306, each corresponding to the individual different computing resource types associated with the network 304. In some examples, the execution of the deception host computing devices 306 may be dynamic in that the deception service 302 may execute more and/or less deception host computing devices 306 as computing resource types are added and/or dropped from the network 304.

The deception service 302 may then determine a number of deceptions 306 to emulate on the network 304. For example, each of the deception host computing devices 306 may be configured to provide the functionality and/or protocols associated with the computing resource types in the network 304, and the deceptions 306 may be configured to emulate various services provided by the computing resource types (e.g., providing different functionality and/or utilizing different protocols). The deception service 302 may generate the number of deceptions 306 to emulate on the host computing devices. As previously described, the deceptions 306 may be associated with the computing resource types in the network. The deception service 302 may then store a first mapping between the deceptions 306 and the deception host computing devices 306. In some examples, the first mapping may be based at least in part on the protocols associated with the deceptions 306 and/or the computing resource types associated with the deception host computing devices 306.

Additionally, or alternatively, the deception service 302 may assign multiple IP addresses in the network 304 to a single deception 306 in the network 304. In some examples, the deception service 302 may determine a percentage (e.g., a density of deceptions in the network compared to real hosts) of deceptions 306 to emulate on the network 304. A policy may be leveraged by the deception service 302 to determine the percentage of deceptions 306 to emulate. For example, a network administrator associated with the network 304 may configure a policy at deception service 302 indicating a density of deceptions 306 to maintain on the network 304 when possible, such as, for example 90 percent of the hosts being deceptions 306 in the network 304 and the remaining 10 percent being actual hosts in the network 304. That is, the deception service 302 may maintain a pool of available IP addresses associated with the network 304. The deception service 302 may assign and/or unassign the IP addresses from actual hosts as they join and/or leave the network 304. Additionally, or alternatively, the deception service 302 may assign the available IP addresses to the deceptions 306 on the network to satisfy the density of deceptions 306. For example, if 7 percent of IP addresses are currently being utilized by actual hosts on the network 304, the deception service 302 may be configured to assign 90 percent of the IP addresses to the deceptions 306 and leave the remaining 3 percent unassigned. Additionally, or alternatively, if the policy indicated that 95 percent of the hosts should be deceptions 306 and 7 percent are already assigned to the actual hosts, the deception service 302 may assign 93 percent of the IP addresses to the deceptions 306. In some examples, as actual hosts disconnect from the network 304 (e.g., outside of work hours) the deception service 302 may recycle the IP addresses previously assigned to the actual hosts to the deceptions 306 until the threshold density is met. As actual hosts come back online, the deception service 302 may then free up IP addresses from the deceptions 306 as needed and assign them to the actual hosts. The deception service 302 may store a second mapping between IP addresses in the network 304 and the deceptions 306. The deception service 302 may then deploy the deceptions 306 to the deception host computing device 306 based at least partly on the first mapping and/or the second mapping.

Once the deceptions 306 have been deployed in the network, the deception service 302 may begin monitoring the deceptions 306 for activity.

At "1," the DNS proxy 312 associated with the deception service 302 may receive a request for a hostname associated with the network 304.

At "2," the DNS proxy 312 may resolve the hostname by forwarding the request to the DNS server 318 of the network 304.

At "3," the DNS server 318 may respond in one of many ways, such as, for example, a hostname of an actual host in the network, an NXDOMAIN response, a NODATA response. The deception service 302 may also be configurable by a policy associated with the network 304, such as, for example configuring a percentage of NXDOMAIN and/or NODATA responses (e.g., a request associated with a non-existent hostname) to return a deception IP address.

At "4," the DNS proxy 312 of the deception service 302 may receive a response indicating that the requested host is a non-existent host in the network 304. Based on the configuration of the deception service 302, the deception service 302 may then request a NAT IP (e.g., an IP address mapped to a deception 306) from the programmable NAT service 314.

At "5," the NAT service 314 may then get a deception 306 from the pool of IP addresses.

At "6," the DHCP proxy 316 may be configured to manage the assigning and freeing of IP addresses to and/or from deceptions 306 and/or actual hosts, as previously described.

At "7," the NAT service 314 may then map the NAT to an IP address in the network 304.

At "8," the NAT service 314 may return the NAT IP to the DNS proxy 312, and the DNS proxy 312 may then establish a connection between the attacker and a corresponding deception host computing device 306 hosting the deception 306.

At "9," the DNS proxy 312 may handle subsequent requests to connect to the NAT mapped IP address (e.g., the deception 306) and may connect the attacker with the corresponding deception host computing device 306 hosting the deception 306. This stickiness is described in more detail above.

Additionally, or alternatively, the deception service 302 may monitor activity of the connection to the deception 306. For example, the deception service 302 may be configured to determine a first IP address associated with the connection and based on the second mapping between the IP addresses and the deceptions 306, the deception service 302 may identify a first deception 302 associated with the first IP address. From this point, the deception service 302 may be configured to take no action until a threshold interaction (e.g., an exchange of authentication data, an exchange of authorization data, an exchange of credentials, an SSH connection, and/or the like) with the first deception 306 has occurred. That is, the deception service 302 may identify an interaction associated with the first deception 306 and determine whether the interaction satisfies the threshold interaction for isolating the deception 306. If the interaction satisfies the threshold, the deception service 302 may isolate the first deception 306 from the deceptions 306 (e.g., containerizing the deception 306), where the interaction may be further monitored by the deception service 302 and/or deception techniques may be employed by the deception service 302 and/or an additional deception technique service to attract the attacker to interact with the deception 306 further.

With the first deception 306 isolated from the other deceptions 306, the deception service 302 may generate a new deception 306 being the same type as the first deception 306 that was isolated and/or being associated with the computing resource type of the deception host 306 on which the first deception 306 was executing. The IP addresses that were previously assigned to the first deception 306 may now be assigned to the new deception 306 (and additional IP addresses to reach the deception threshold density if necessary), and the second mapping between IP addresses and deceptions 306 is updated to reflect the new deception 306. The new deception 306 may then be deployed to a deception host computing device 306 based on the updated second mapping.

Additionally, or alternatively, the deception service 302 may be leveraged and/or implemented in accordance with the ZTNA and/or authorization chain techniques described above with respect to FIGS. 1-2C. That is, the enterprise network(s) 110, 208 as described with respect to FIGS. 1-2C may leverage the deception service 302 from a service provider to deploy deceptions at scale in the enterprise network(s) 110, 208.

FIGS. 4-9 illustrate flow diagrams of example methods 400-900 and that illustrate aspects of the functions performed at least partly by the cloud network(s), the enterprise network(s), the application network(s), and/or the metadata-aware network(s) and/or by the respective components within as described in FIGS. 1-3. The logical operations described herein with respect to FIGS. 4-9 may be implemented (1) as a sequence of computer-implemented acts or program modules running on a computing system and/or (2) as interconnected machine logic circuits or circuit modules within the computing system. In some examples, the method(s) 400-900 may be performed by a system comprising one or more processors and one or more non-transitory computer-readable media storing computer-executable instructions that, when executed by the one or more processors, cause the one or more processors to perform the method(s) 400-900.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4-9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4:
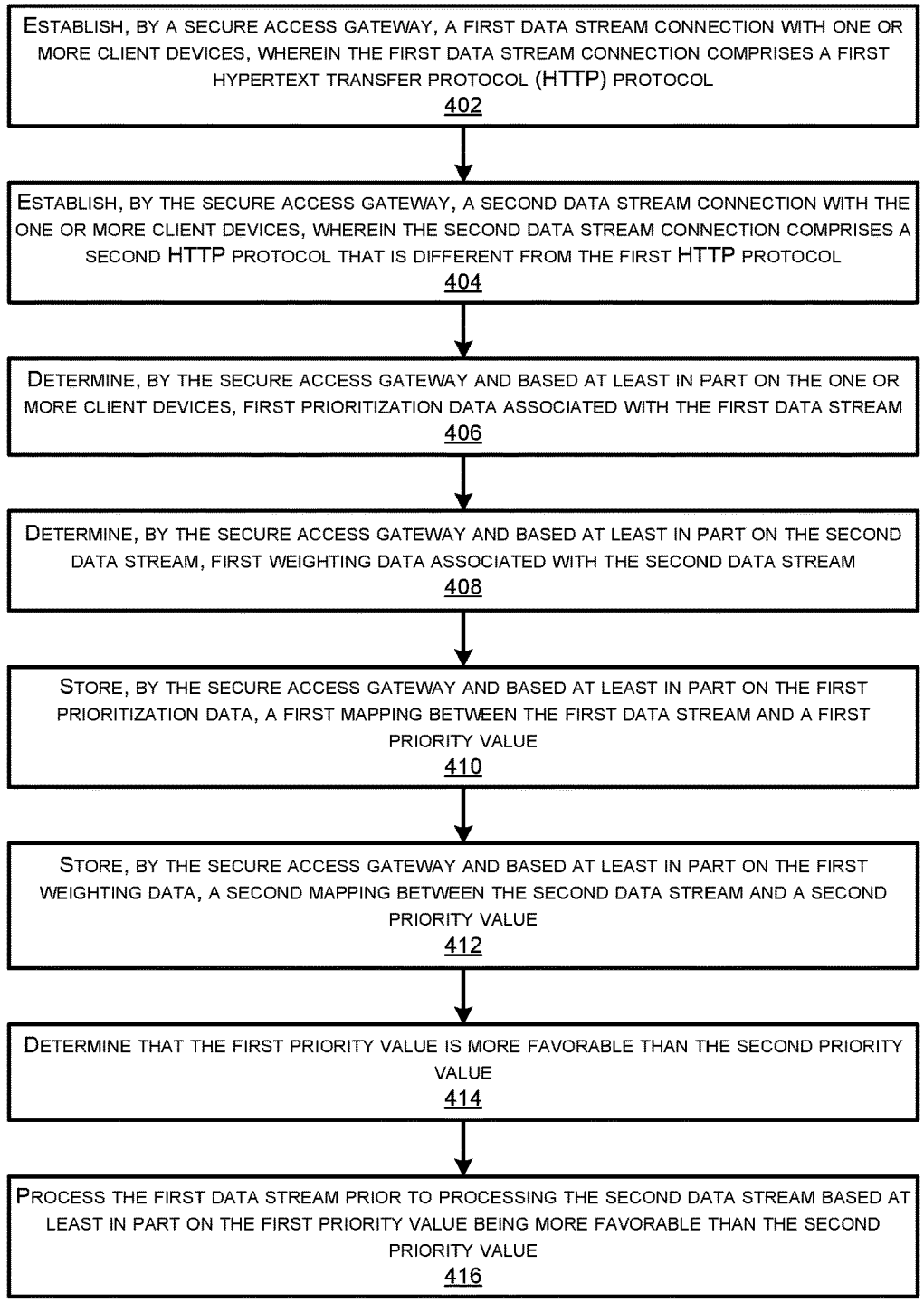
FIG. 4 illustrates a flow diagram of an example method for a secure access gateway to assign compute and networking prioritization to individual streams within the HTTP/2 and/or HTTP/3 multiplexed session for ZTNA.

FIG. 4 illustrates a flow diagram of an example method 400 for a secure access gateway to assign compute and networking prioritization to individual streams within the HTTP/2 and/or HTTP/3 multiplexed session for ZTNA. In some examples, the secure access gateway may correspond to the secure access gateway 102, as described with respect to FIG. 1.

At 402, the process 400 may include establishing, by a secure access gateway, a first data stream connection with one or more client devices. In some examples, the first data stream connection may comprise a first hypertext transfer protocol (HTTP) protocol. Additionally, or alternatively, the client devices may correspond to the client device(s) 104 as described with respect to FIG. 1.

At 404, the process 400 may include establishing, by the secure access gateway, a second data stream connection with the one or more client devices. In some examples, the second data stream connection may comprise a second HTTP protocol that is different from the first HTTP protocol.

At 406, the process 400 may include determining first prioritization data associated with the first data stream. In some examples, the first prioritization data may be determined by the secure access gateway and/or based at least in part on the one or more client devices.

At 408, the process 400 may include determining first weighting data associated with the second data stream. In some examples, the first weighting data may be determined by the secure access gateway and/or based at least in part on the second data stream.

At 410, the process 400 may include storing a first mapping between the first data stream and a first priority value. In some examples, first mapping may be stored by the secure access gateway and/or based at least in part on the first prioritization data. Additionally, or alternatively, the first priority value may correspond to the gateway priority value(s), as described with respect to FIG. 1.

At 412, the process 400 may include storing a second mapping between the second data stream and a second priority value. In some examples, the second mapping may be stored by the secure access gateway and/or based at least in part on the first weighting data. Additionally, or alternatively, the second priority value may correspond to the gateway priority value(s), as described with respect to FIG. 1.

At 414, the process 400 may include determining that the first priority value is more favorable than the second priority value. In some examples, determining that the first priority value is more favorable than the second priority value may be based at least in part on determining that the first priority value is greater than the second priority value.

At 416, the process 400 may include processing the first data stream prior to processing the second data stream based at least in part on the first priority value being more favorable than the second priority value.

In some examples, the first HTTP protocol may be an HTTP/3 protocol and/or the second HTTP protocol may be an HTTP/2 protocol.

In some examples, processing the first data stream may comprise at least one of performing an encryption process associated with the first data stream, performing a decryption process associated with the first data stream, performing a proxy process associated with the first data stream, performing a routing process associated with the first data stream, performing a forwarding process associated with the first data stream, performing an encapsulation process associated with the first data stream, and/or performing a decapsulation process associated with the first data stream.

Additionally, or alternatively, the process 400 may include identifying, in a packet associated with the second data stream, one or more bits indicating the first weighting data. In some examples, determining the first weighting data associated with the second data stream may be based at least in part on identifying the one or more bits.

Additionally, or alternatively, the process 400 may include receiving, from a client device of the one or more client devices, an indication of the first prioritization data associated with the first data stream. In some examples, determining the first prioritization data associated with the first data stream may be based at least in part on receiving the indication.

Additionally, or alternatively, the process 400 may include determining, by the secure access gateway, a target resource associated with the first data stream. Additionally, or alternatively, the process 400 may include establishing, by the secure access gateway, a third data stream connection with the target resource, wherein the third data stream comprises at least one of a QUIC protocol, a UDP protocol, or a transmission control protocol (TCP). Additionally, or alternatively, the process 400 may include transmitting network data, received at the secure access gateway via the first data stream, to the target resource via the third data stream prior to processing the second data stream.

Additionally, or alternatively, the process 400 may include determining, by the secure access gateway, one or more quality of service (QOS) bits associated with the first data stream. In some examples, the one or more QOS bits may represent the first mapping between the first data stream and the first priority value. Additionally, or alternatively, the process 400 may include sending, from the secure access gateway and to the target resource, the one or more QOS bits associated with the first data stream. In some examples, the one or more QOS bits may cause the target resource to process the first data stream prior to processing at least the second data stream.

Figure 5:
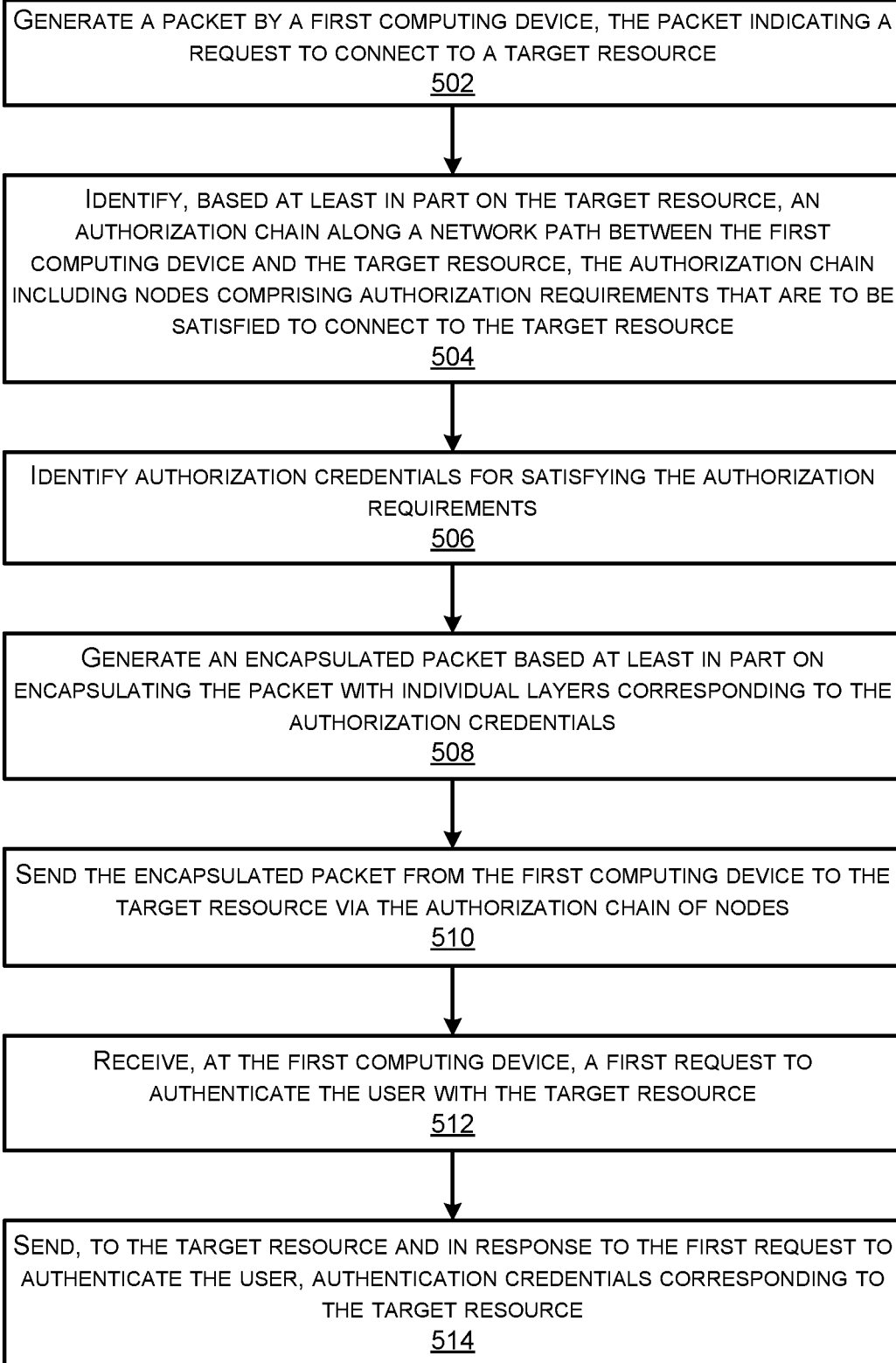
FIG. 5 illustrates a flow diagram of an example method for a client computing device to establish a ZTNA connection with a target resource of a network, such as, for example, an enterprise network, via one or more authorization nodes (e.g., network proxies, network relays, and/or the like) configured as an authorization chain.

FIG. 5 illustrates a flow diagram of an example method 500 for a client computing device to establish a ZTNA connection with a target resource of a network, such as, for example, an enterprise network, via one or more authorization nodes (e.g., network proxies, network relays, and/or the like) configured as an authorization chain. In some examples, the client computing device, the target resource, the network, and/or the authorization nodes may correspond to the client device(s) 202, the target resource(s) 206, the enterprise network 208, and/or the nodes 210, as described with respect to FIG. 2A, respectively.

At 502, the process 500 may include generating a packet by a first computing device. In some examples, the packet may indicate a request to connect to a target resource.

At 504, the process 500 may include identifying, based at least in part on the target resource, an authorization chain along a network path between the first computing device and the target resource. In some examples, the authorization chain may include nodes comprising authorization requirements that are to be satisfied to connect to the target resource.

At 506, the process 500 may include identifying authorization credentials for satisfying the authorization requirements. In some examples, the authorization credentials may correspond to the authorization credentials 214 as described with respect to FIG. 2A.

At 508, the process 500 may include generating an encapsulated packet based at least in part on encapsulating the packet with individual encryption layers corresponding to the authorization credentials. In some examples, the encryption layers may correspond to the encryption layers 216 as described with respect to FIG. 2A.

At 510, the process 500 may include sending the encapsulated packet from the first computing device to the target resource via the authorization chain of nodes.

At 512, the process 500 may include receiving, at the first computing device, a first request to authenticate a user with the target resource. In some examples, the user may be associated with the first computing device.

At 514, the process 500 may include sending, to the target resource and in response to the first request to authenticate the user, authentication credentials corresponding to the target resource.

In some examples, individual ones of the nodes may be configured as one of a proxy node or a relay node. Additionally, or alternatively, individual ones of the authorization credentials may comprise at least one of an authorization certificate or a privacy pass.

Additionally, or alternatively, the process 500 may include causing the first computing device to display the request to authenticate the user with the target resource. Additionally, or alternatively, the process 500 may include receiving, by the first computing device, a user input representing the authentication credentials.

Additionally, or alternatively, the process 500 may include determining, based at least in part on the authorization chain, that a first node associated with a first authorization requirement will receive the encapsulated packet prior to a second node associated with a second authorization requirement. Additionally, or alternatively, generating the encapsulated packet may comprise encapsulating the packet with a first encryption layer comprising a first authorization credential configured to satisfy the second authorization requirement. Additionally, or alternatively, generating the encapsulated packet may comprise encapsulating the packet with a second encryption layer comprising a second authorization credential configured to satisfy the first authorization requirement. In some examples, the first encryption layer is encapsulated by the second encryption layer.

Additionally, or alternatively, the process 500 may include encrypting the first encryption layer using a first type of encryption. In some examples, the first type of encryption may be configured such that the second node can decrypt the first authorization credential from the first encryption layer.

Additionally, or alternatively, the process 500 may include encrypting the second encryption layer using a second type of encryption that is different from the first type of encryption. In some examples, the second type of encryption being configured such that the first node can decrypt the second authorization credential.

Additionally, or alternatively, the process 500 may include determining an order of the nodes associated with the authorization chain. In some examples, the order may indicate a first node at a beginning of the authorization chain. Additionally, or alternatively, the process 500 may include establishing a connection between the first computing device and a first node of the nodes associated with the authorization chain. In some examples, the connection may comprise one of a QUIC protocol or a hypertext transfer protocol (HTTP)/2 protocol. In some examples, sending the encapsulated packet to the target resource may comprise sending the encapsulated packet to the first node via the connection.

In some examples, the request to authenticate the user with the target resource may be a first request. Additionally, or alternatively, the process 500 may include receiving, at the first computing device and from a node of the nodes associated with the authorization chain, a second request for user input associated with an authorization credential of the authorization credentials. In some examples, the second request may be received prior to the first request. Additionally, or alternatively, the process 500 may include receiving, via the first computing device, the user input associated with the authorization credential. Additionally, or alternatively, the process 500 may include sending, to the node and in response to the second request for the user input, the user input associated with the authorization credential.

Figure 6:
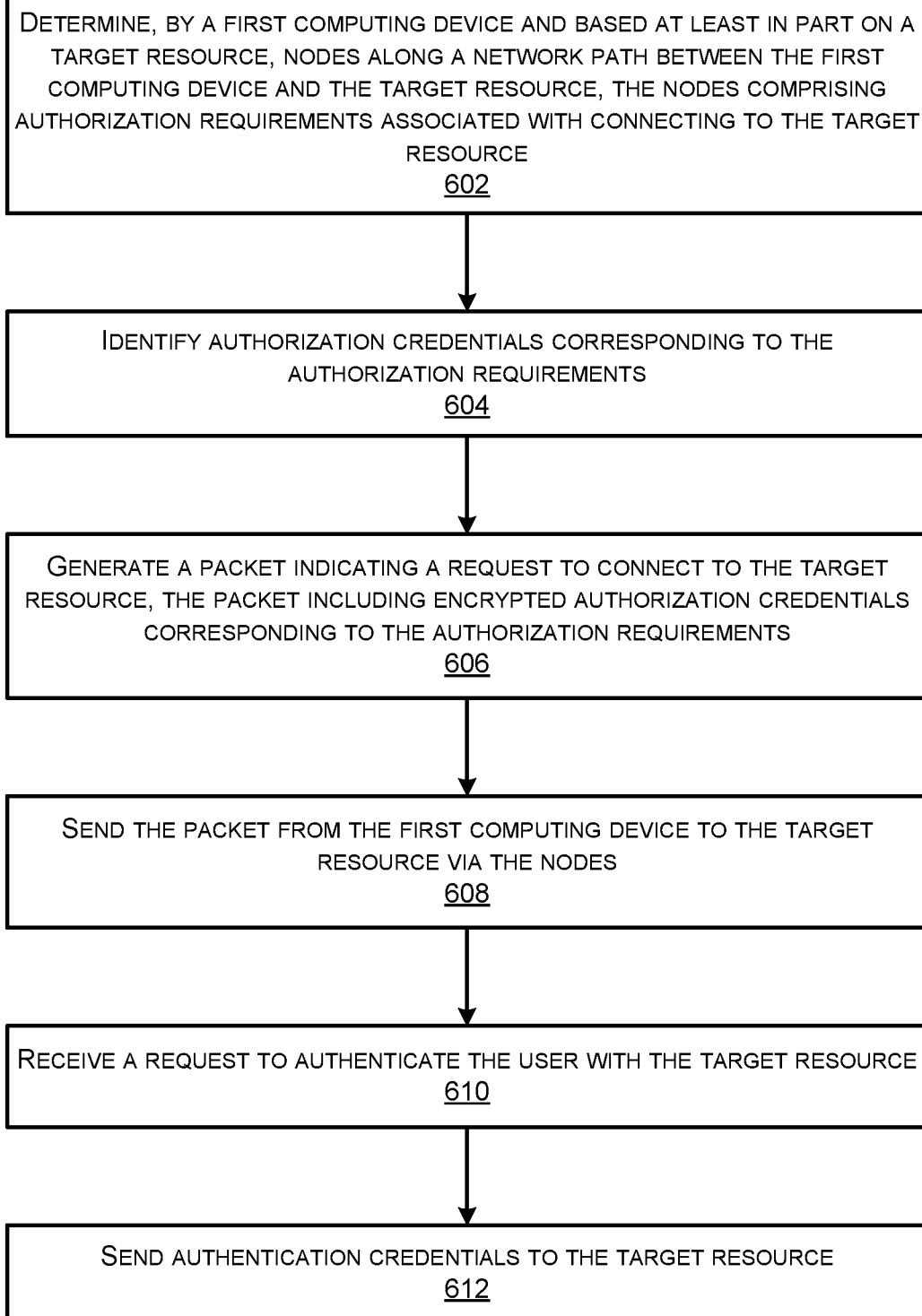
FIG. 6 illustrates a flow diagram of another example method for a client computing device to establish a ZTNA connection with a target resource of a network, such as, for example, an enterprise network, via one or more authorization nodes (e.g., network proxies, network relays, and/or the like) configured as an authorization chain.

FIG. 6 illustrates a flow diagram of another example method 600 for a client computing device to establish a ZTNA connection with a target resource of a network, such as, for example, an enterprise network, via one or more authorization nodes (e.g., network proxies, network relays, and/or the like) configured as an authorization chain. In some examples, the client computing device, the target resource, the network, and/or the authorization nodes may correspond to the client device(s) 202, the target resource(s) 206, the enterprise network 208, and/or the nodes 210, as described with respect to FIG. 2B, respectively.

At 602, the process 600 may include determining, by a first computing device and based at least in part on a target resource, nodes along a network path between the first computing device and the target resource. In some examples, the nodes may comprise authorization requirements associated with connecting to the target resource.

At 604, the process 600 may include identifying authorization credentials corresponding to the authorization requirements.

At 606, the process 600 may include generating a packet indicating a request to connect to the target resource. In some examples, the packet may include encrypted authorization credentials corresponding to the authorization requirements. Additionally, or alternatively, the authorization credentials may correspond to the encrypted credentials 224, as described with respect to FIG. 2B.

At 608, the process 600 may include sending the packet from the first computing device to the target resource via the nodes.

At 610, the process 600 may include receiving a request to authenticate a user with the target resource, the user being associated with the first computing device.

At 612, the process 600 may include sending authentication credentials to the target resource.

Additionally, or alternatively, the process 600 may include determining, based at least in part on the nodes along the network path, a first type of encryption associated with a first node of the nodes. Additionally, or alternatively, the process 600 may include encrypting a first authorization credential of the authorization credentials using the first type of encryption. In some examples, the first type of encryption may be configured such that the first node associated with a first authorization requirement can decrypt the first authorization credential. Additionally, or alternatively, the process 600 may include determining, based at least in part on the nodes along the network path, a second type of encryption associated with a second node of the nodes. In some examples, the second type of encryption may be different from the first encryption type. Additionally, or alternatively, the process 600 may include encrypting a second authorization credential of the authorization credentials using the second type of encryption. In some examples, the second type of encryption may be configured such that the second node associated with a second authorization requirement can decrypt the second authorization credential.

In some examples, the first node associated with the first authorization requirement may be configured to decrypt the first authorization credential based at least in part on a first type of decryption associated with the first type of encryption, process the first authorization credential, subsequent to processing the first authorization credential, modify the packet to include an indication that the first authorization credential has been expended, and/or send the packet to the second node.

In some examples, individual ones of the nodes are configured as one of a proxy node or a relay node. Additionally, or alternatively, individual ones of the authorization credentials comprise at least one of an authorization certificate or a privacy pass.

Additionally, or alternatively, the process 600 may include causing the first computing device to display the request to authenticate the user with the target resource. Additionally, or alternatively, the process 600 may include receiving, by the first computing device, a user input representing the authentication credentials.

Additionally, or alternatively, the process 600 may include determining an order of the nodes along the network path between the first computing device and the target resource. Additionally, or alternatively, the process 600 may include establishing, based at least in part on the order, a connection between the first computing device and a first node of the nodes. In some examples, the connection may comprise one of a QUIC protocol or a hypertext transfer protocol (HTTP)/2 protocol. In some examples, sending the packet to the target resource may comprise sending the packet to the first node via the connection.

In some examples, the request to authenticate the user with the target resource may be a first request. Additionally, or alternatively, the process 600 may include receiving, at the first computing device and from a node of the nodes along the network path between the first computing device and the target resource, a second request for user input associated with an authorization credential of the authorization credentials. In some examples, the second request may be received prior to the first request. Additionally, or alternatively, the process 600 may include receiving, via the first computing device, the user input associated with the authorization credential. Additionally, or alternatively, the process 600 may include sending, to the node and in response to the second request for the user input, the user input associated with the authorization credential.

Figure 7:
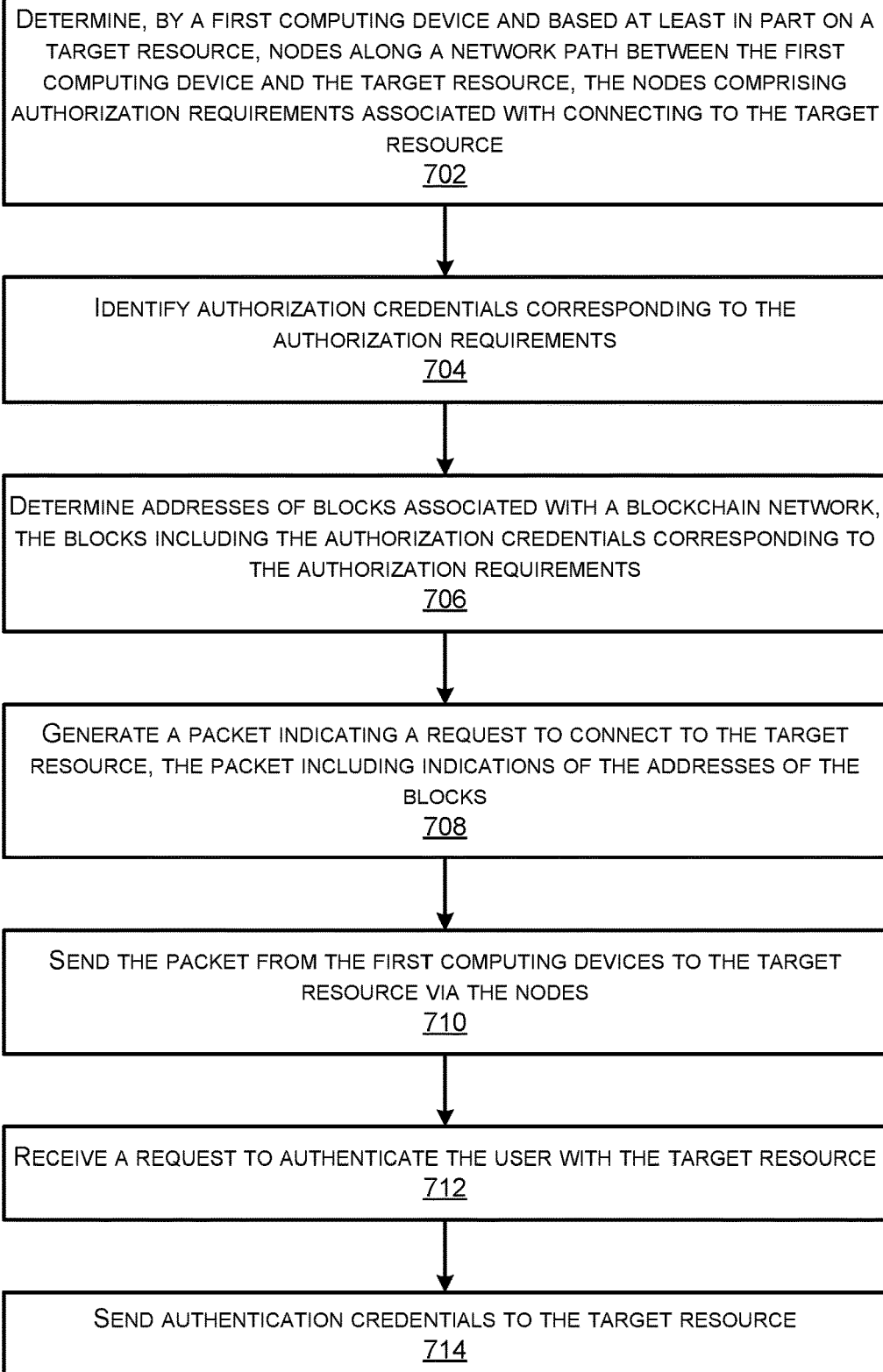
FIG. 7 illustrates a flow diagram of another example method for a client computing device to establish a ZTNA connection with a target resource of a network, such as, for example, an enterprise network, via one or more authorization nodes (e.g., network proxies, network relays, and/or the like) configured as an authorization chain.

FIG. 7 illustrates a flow diagram of another example method 700 for a client computing device to establish a ZTNA connection with a target resource of a network, such as, for example, an enterprise network, via one or more authorization nodes (e.g., network proxies, network relays, and/or the like) configured as an authorization chain. In some examples, the client computing device, the target resource, the network, and/or the authorization nodes may correspond to the client device(s) 202, the target resource(s) 206, the enterprise network 208, and/or the nodes 210, as described with respect to FIG. 2C, respectively.

At 702, the process 700 may include determining, by a first computing device and based at least in part on a target resource, nodes along a network path between the first computing device and the target resource. In some examples, the nodes may comprise authorization requirements associated with connecting to the target resource.

At 704, the process 700 may include identifying authorization credentials corresponding to the authorization requirements. In some examples, the authorization credentials may correspond to the encrypted authorization credentials 224, as described with respect to FIG. 2C.

At 706, the process 700 may include storing the authorization credentials in blocks of a ledger associated with a blockchain network. In some examples, the blocks and/or the blockchain network may correspond to the blocks 236 and/or the blockchain 234, as described with respect to FIG. 2C.

At 708, the process 700 may include generating a packet indicating a request to connect to the target resource, the packet including indications of addresses of the blocks associated with the blockchain network. In some examples, the blocks may include the authorization credentials corresponding to the authorization requirements.

At 710, the process 700 may include sending the packet from the first computing devices to the target resource via the nodes.

At 712, the process 700 may include receiving a request to authenticate a user with the target resource, the user being associated with the first computing device.

At 714, the process 700 may include sending authentication credentials to the target resource.

Additionally, or alternatively, the process 700 may include determining an order of the nodes along the network path between the first computing device and the target resource. In some examples, the packet may include the indications of the addresses of the blocks arranged according to the order.

Additionally, or alternatively, the process 700 may include determining, based at least in part on the nodes along the network path between the first computing device and the target resource, that a first node associated with a first authorization requirement will receive the packet prior to a second node associated with a second authorization requirement. Additionally, or alternatively, storing the authorization credentials in the block may comprise storing a first authorization credential corresponding to the first authorization requirement in a first block of the ledger and/or storing a second authorization credential corresponding to the second authorization requirement in a second block. In some examples, the second block may have a header including a hash of the first block as an indication of a previous block.

In some examples, the first node associated with the first authorization requirement may be configured to decrypt the first authorization credential from the first block, process the first authorization credential, subsequent to processing the first authorization credential, modify the hash of the first block to include an indication that the first authorization credential has been expended, and/or send the packet to the second node.

In some examples, the second node associated with the second authorization requirement may be configured to determine, based on the hash of the first block, that the first authorization credential has been expended and/or subsequent to determining that the first authorization credential has been expended, process the second authorization credential.

Additionally, or alternatively, the process 700 may include causing the first computing device to display the request to authenticate the user with the target resource. Additionally, or alternatively, the process 700 may include receiving, by the first computing device, a user input representing the authentication credentials.

Figure 8:
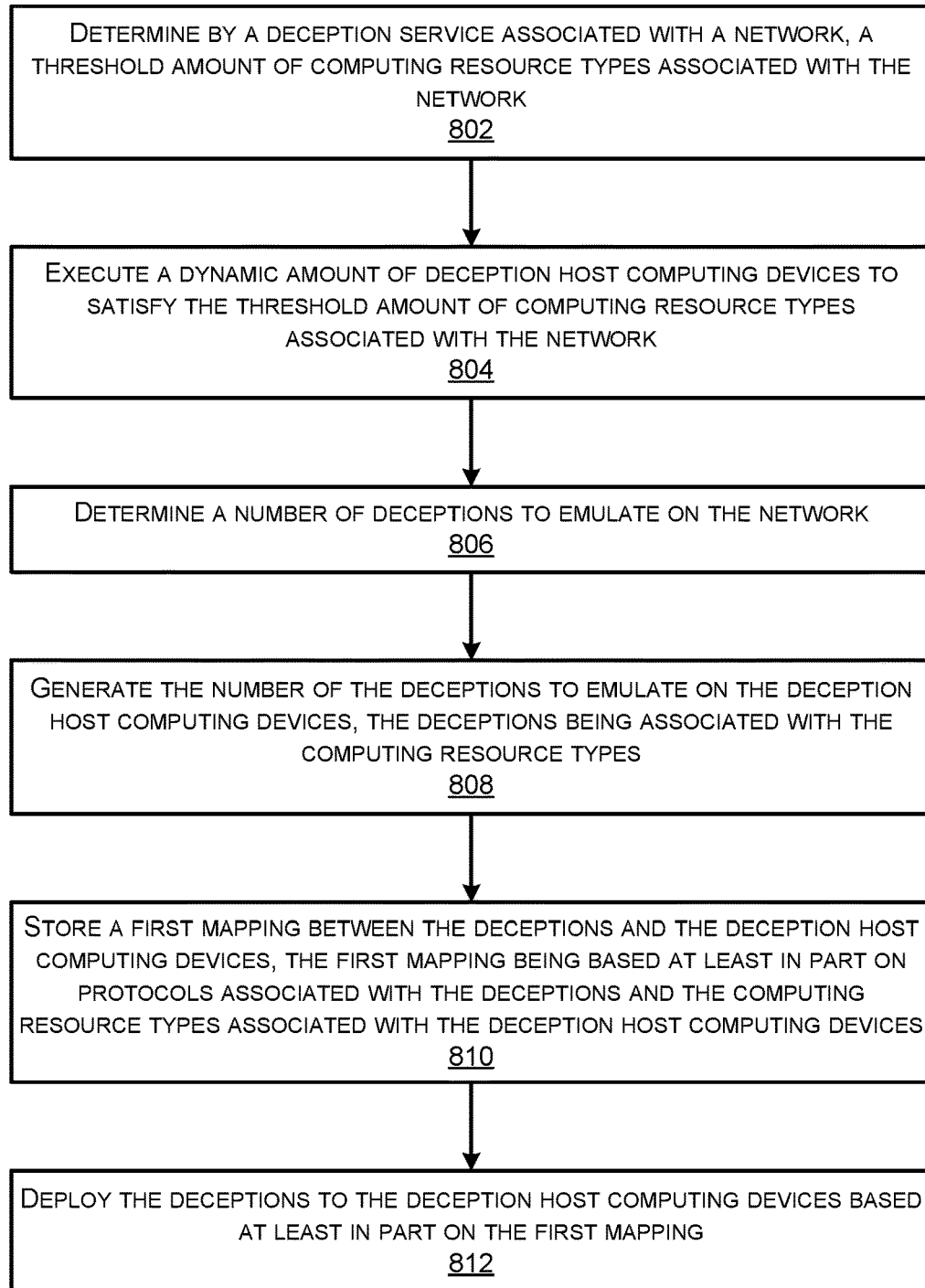
FIG. 8 illustrates a flow diagram of an example method for a deception service associated with a network to deploy deceptions at scale in the network.

FIG. 8 illustrates a flow diagram of an example method 800 for a deception service associated with a network to deploy deceptions at scale in the network. In some examples, the deception service, the network, and/or the deceptions may correspond to the deception service 302, the deceptions 306, and/or the client network 304 as described with respect to FIG. 3, respectively. Additionally, or alternatively, the deception service may be associated with a DNS proxy, a programmable NAT, and/or a DHCP proxy, such as, for example, the DNS proxy 312, the programmable NAT 314, and/or the DHCP proxy 316, as described with respect to FIG. 3, respectively.

At 802, the process 800 may include determining, by a deception service associated with a network, a threshold amount of computing resource types associated with the network.

At 804, the process 800 may include executing a dynamic amount of deception host computing devices to satisfy the threshold amount of computing resource types associated with the network. In some examples, the deception host computing devices may correspond to the physical or emulated deception hosts 306, as described with respect to FIG. 3.

At 806, the process 800 may include determining a number of deceptions to emulate on the network.

At 808, the process 800 may include generating the number of the deceptions to emulate on the deception host computing devices, the deceptions being associated with the computing resource types.

At 810, the process 800 may include storing a first mapping between the deceptions and the deception host computing devices. In some examples, the first mapping may be based at least in part on protocols associated with the deceptions and/or the computing resource types associated with the deception host computing devices.

At 812, the process 800 may include deploying the deceptions to the deception host computing devices based at least in part on the first mapping.

In some examples, individual ones of the deceptions may comprise emulations of protocols associated with a computing resource type of the computing resource types and/or an emulation of the computing resource type.

Additionally, or alternatively, the process 800 may include receiving, from a computing device associated with the network, a policy indicating a threshold number of deceptions to emulate on the network. Additionally, or alternatively, the process 800 may include determining the number of deceptions to emulate on the network is based at least in part on the policy.

Additionally, or alternatively, the process 800 may include determining internet protocol (IP) addresses associated with the network that are available to be allocated. Additionally, or alternatively, the process 800 may include assigning subsets of the IP addresses to individual ones of the deceptions. Additionally, or alternatively, the process 800 may include storing a second mapping between the IP addresses and the deceptions based at least in part on assigning the subsets of IP addresses to individual ones of the deceptions. In some examples, deploying the deceptions to the deception host computing devices may be based at least in part on the second mapping.

Additionally, or alternatively, the process 800 may include determining that a connection associated with a first deception host computing device of the deception host computing devices has been established. Additionally, or alternatively, the process 800 may include determining a first IP address associated with the connection, the first IP address being included in a first subset of the subsets of IP addresses. Additionally, or alternatively, the process 800 may include based at least in part on the second mapping, identifying a first deception associated with the first IP address. In some examples, the first deception may be deployed to the first deception host computing device and being associated with the first subset of the IP addresses. Additionally, or alternatively, the process 800 may include identifying an interaction associated with the first deception. Additionally, or alternatively, the process 800 may include determining that the interaction satisfies a threshold interaction for isolating the first deception from the deceptions. Additionally, or alternatively, the process 800 may include isolating, based at least in part on determining that the interaction satisfies the threshold interaction, the first deception from the first deception host computing device and the first IP address from the first subset of IP addresses. Additionally, or alternatively, the process 800 may include generating, based at least in part on first computing resource types associated with the first deception, a second deception associated with the first computing resource types. Additionally, or alternatively, the process 800 may include assigning the first subset of IP addresses to the second deception. Additionally, or alternatively, the process 800 may include storing a third mapping between the first subset of IP addresses and the second deception based at least in part on assigning the first subset of IP addresses to the second deception. Additionally, or alternatively, the process 800 may include deploying the second deception to the first deception host computing device based at least in part on the first mapping and the third mapping.

Additionally, or alternatively, the process 800 may include receiving, from a host computing device associated with the network, a request for a first IP address associated with the network. Additionally, or alternatively, the process 800 may include determining that the IP addresses associated with the network are unavailable to be allocated. Additionally, or alternatively, the process 800 may include determining that the first IP address of the IP addresses is assigned to a first deception of the deceptions. Additionally, or alternatively, the process 800 may include unassigning the first IP address from the first deception. Additionally, or alternatively, the process 800 may include updating the second mapping between the IP addresses and the deceptions based at least in part on unassigning the first IP address from the first deception. Additionally, or alternatively, the process 800 may include assigning the first IP address to the host computing device.

Additionally, or alternatively, the process 800 may include determining that the host computing device has an inactive connection on the network. Additionally, or alternatively, the process 800 may include determining that an active number of deceptions associated with the network is below a threshold number of deceptions. Additionally, or alternatively, the process 800 may include unassigning the first IP address from the host computing device. Additionally, or alternatively, the process 800 may include assigning the first IP address to the first deception. Additionally, or alternatively, the process 800 may include updating the second mapping between the IP addresses and the deceptions based at least in part on assigning the first IP address to the first deception.

Figure 9:
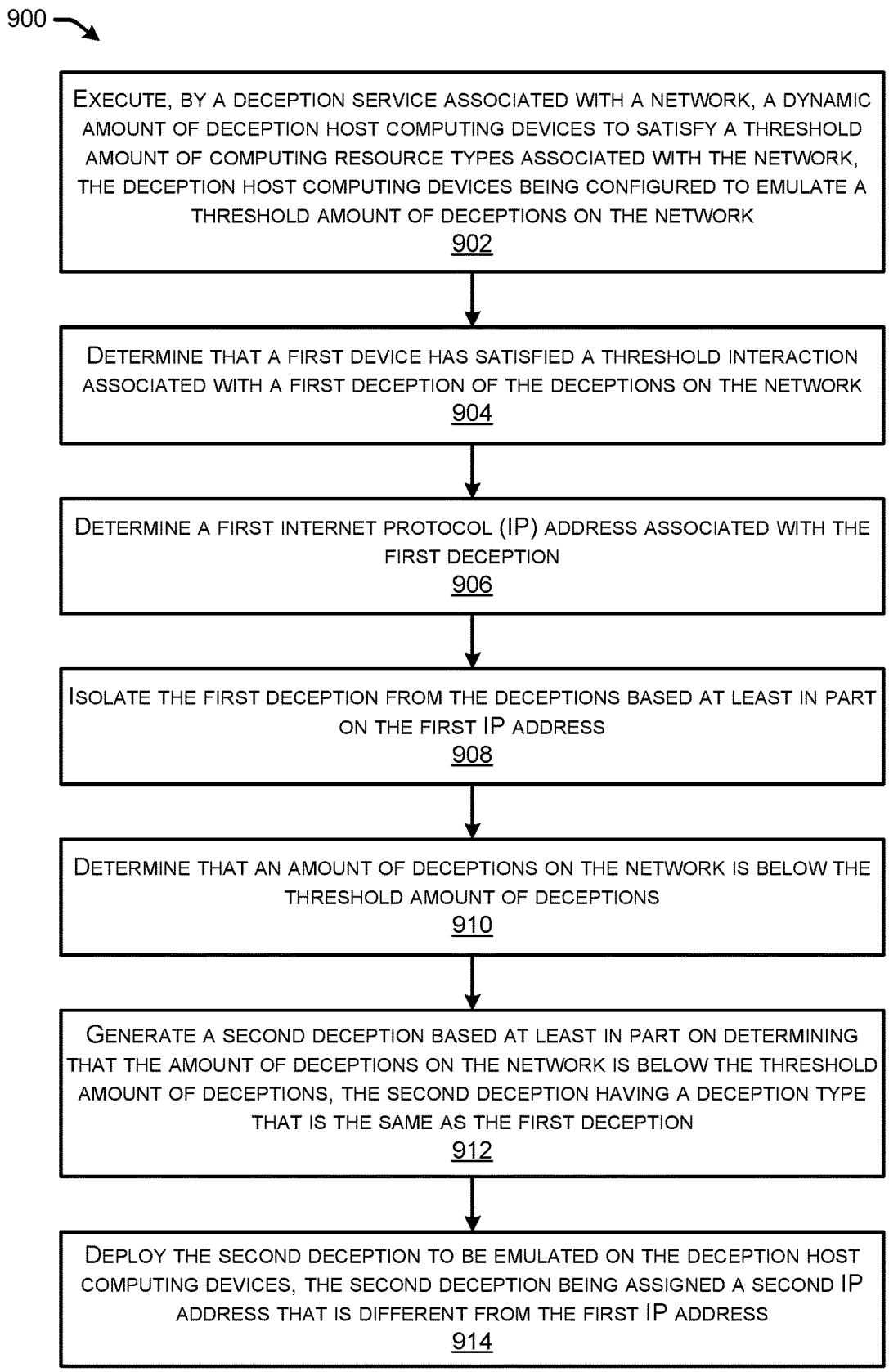
FIG. 9 illustrates a flow diagram of an example method for a deception service associated with a network to isolate a deception from additional deception deployed in the network based on a threshold interaction occurring with respect to the deception.

FIG. 9 illustrates a flow diagram of an example method 900 for a deception service associated with a network to isolate a deception from additional deceptions deployed in the network based on a threshold interaction occurring with respect to the deception. In some examples, the deception service, the network, and/or the deceptions may correspond to the deception service 302, the deceptions 306, and/or the client network 304 as described with respect to FIG. 3, respectively. Additionally, or alternatively, the deception service may be associated with a DNS proxy, a programmable NAT, and/or a DHCP proxy, such as, for example, the DNS proxy 312, the programmable NAT 314, and/or the DHCP proxy 316, as described with respect to FIG. 3, respectively.

At 902, the process 900 may include executing, by a deception service associated with a network, a dynamic amount of deception host computing devices to satisfy a threshold amount of computing resource types associated with the network. In some examples, the deception host computing devices may be configured to emulate a threshold amount of deceptions on the network. Additionally, or alternatively, the deception host computing devices may correspond to the physical or emulated deception hosts 306, as described with respect to FIG. 3.

At 904, the process 900 may include determining that a first device has satisfied a threshold interaction associated with a first deception of the deceptions on the network. Examples of determining that a threshold interaction associated with a deception may be described with respect to FIG. 3.

At 906, the process 900 may include determining a first internet protocol (IP) address associated with the first deception.

At 908, the process 900 may include isolating the first deception from the deceptions based at least in part on the first IP address.

At 910, the process 900 may include determining that an amount of deceptions on the network is below the threshold amount of deceptions.

At 912, the process 900 may include generating a second deception based at least in part on determining that the amount of deceptions on the network is below the threshold amount of deceptions. In some examples, the second deception may have a deception type that is the same as the first deception.

At 914, the process 900 may include deploying the second deception to be emulated on the deception host computing devices. In some examples, the second deception may be assigned a second IP address that is different from the first IP address.

In some examples, determining the first device has satisfied the threshold interaction associated with the first deception may comprise at least one of determining that the first device has exchanged credentials with the first deception, determining that the first device has exchanged authorization data with the first deception, determining that the first device has exchanged authentication data with the first deception, and/or determining that a Secure Shell (SSH) protocol connection has been established between the first device and the first deception.

Additionally, or alternatively, the process 900 may include storing a mapping between IP addresses associated with the network and the deceptions on the network. Additionally, or alternatively, the process 900 may include receiving, from a host computing device associated with the network, a request for an IP address of the IP addresses associated with the network. Additionally, or alternatively, the process 900 may include determining that the IP addresses associated with the network are unavailable to be allocated. Additionally, or alternatively, the process 900 may include unassigning the second IP address from the second deception. Additionally, or alternatively, the process 900 may include assigning the second IP address to the host computing device. Additionally, or alternatively, the process 900 may include updating the mapping between the IP addresses and the deceptions on the network based at least in part on assigning the second IP address to the host computing device.

Additionally, or alternatively, the process 900 may include determining that the host computing device has an inactive connection on the network. Additionally, or alternatively, the process 900 may include determining that the amount of deceptions on the network is below the threshold amount of deceptions. Additionally, or alternatively, the process 900 may include unassigning the second IP address from the host computing device based at least in part on determining that the host computing device has the inactive connection on the network. Additionally, or alternatively, the process 900 may include assigning the second IP address to the second deception based at least in part on determining that the amount of deceptions on the network is below the threshold amount of deceptions. Additionally, or alternatively, the process 900 may include updating the mapping between the IP addresses and the deceptions on the network based at least in part on assigning the second IP address to the host computing device.

Additionally, or alternatively, the process 900 may include receiving, at a first time that is prior to isolating the first deception, a first query indicating a first hostname associated with the network. Additionally, or alternatively, the process 900 may include determining that the first hostname is associated with the first deception. Additionally, or alternatively, the process 900 may include returning, responsive to the first query, the first IP address associated with the first deception. Additionally, or alternatively, the process 900 may include isolating the first deception from the deceptions at a second time that is subsequent to the first time. In some examples, the first deception may be isolated from the deceptions until a third time that is subsequent to the second time. Additionally, or alternatively, the process 900 may include receiving, at a fourth time that is subsequent to the second time, a second query indicating the first hostname. Additionally, or alternatively, the process 900 may include returning, responsive to the second query based at least in part on determining that the fourth time is prior to the third time, the first IP address associated with the first deception.

Additionally, or alternatively, the process 900 may include receiving, from a computing device associated with the network, a policy indicating the threshold amount of deceptions to emulate on the network. In some examples, the threshold amount of deceptions to emulate on the network includes at least one of a number of deceptions to emulate on the network and/or a percentage of IP addresses associated with the network that are to be assigned to the deceptions.

Figure 10:
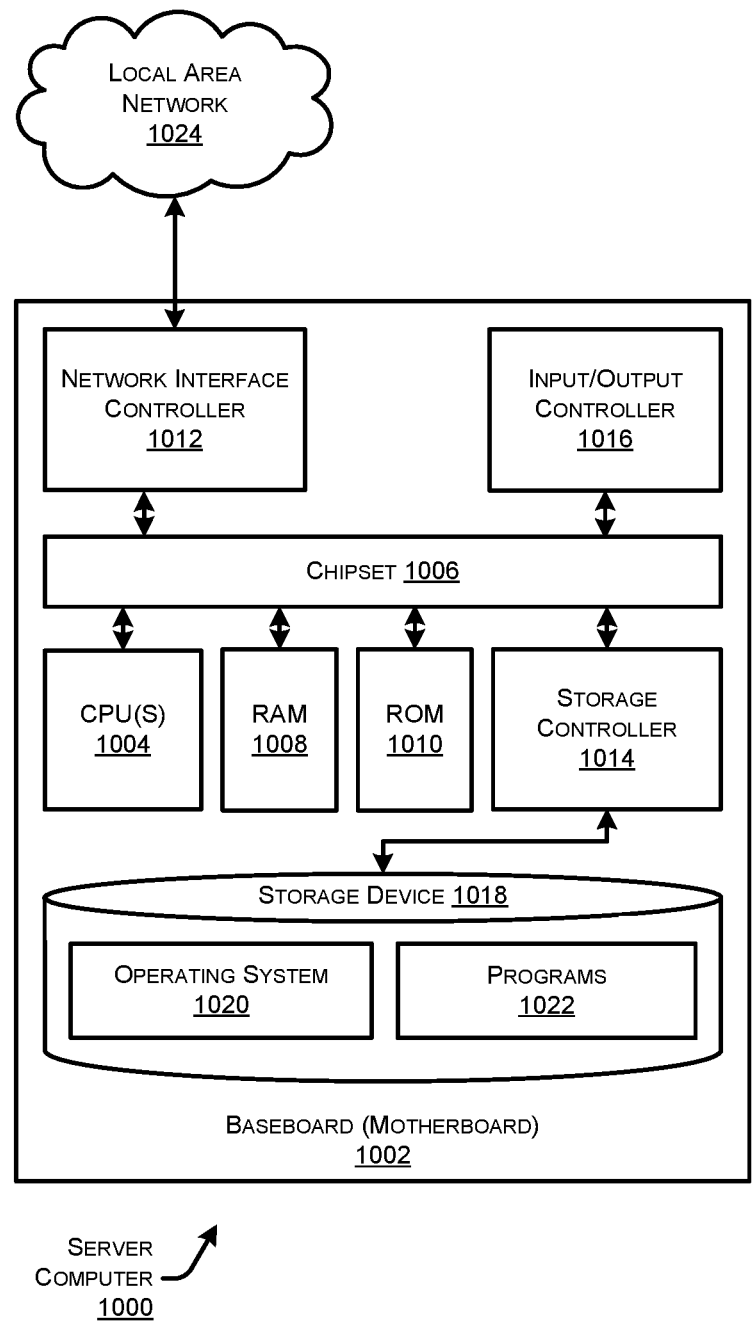
FIG. 10 is a computer architecture diagram showing an illustrative computer hardware architecture for implement-

FIG. 10 shows an example computer architecture for a computing device (or network routing device) 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computing device 1000 may, in some examples, correspond to a physical server associated with the network(s), the secure access gateway, the node(s), the remote network(s), the enterprise network(s), and/or the client network(s) as described in FIGS. 1-3.

The computing device 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computing device 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computing device 1000. The chipset 1006 can further provide an interface to a computer-readable storage medium such as a read-only memory ("ROM") 1010 or non-volatile RAM ("NVRAM") for storing basic routines that help to startup the computing device 1000 and to transfer information between the various components and devices. The ROM 1010 or NVRAM can also store other software components necessary for the operation of the computing device 1000 in accordance with the configurations described herein.

The computing device 1000 can operate in a networked environment using logical connections to remote computing devices and computer systems through a network, such as the network 1024. The chipset 1006 can include functionality for providing network connectivity through a NIC 1012, such as a gigabit Ethernet adapter. The NIC 1012 is capable of connecting the computing device 1000 to other computing devices over the network 1024. It should be appreciated that multiple NICs 1012 can be present in the computing device 1000, connecting the computer to other types of networks and remote computer systems.

The computing device 1000 can be connected to a storage device 1018 that provides non-volatile storage for the computing device 1000. The storage device 1018 can store an operating system 1020, programs 1022, and data, which have been described in greater detail herein. The storage device 1018 can be connected to the computing device 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computing device 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 can further read information from the storage device 1018 by detecting the physical states or characteristics of one or more particular locations within the physical storage units.

In addition to the mass storage device 1018 described above, the computing device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1000. In some examples, the operations performed by the computing resource network 102, and or any components included therein, may be supported by one or more devices similar to computing device 1000. Stated otherwise, some or all of the operations performed by a physical server associated with the network(s), the secure access gateway, the node(s), the remote network(s), the enterprise network(s), and/or the client network(s), and/or any components included therein, as described in FIGS. 1-3, may be performed by one or more computing device 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computing device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computing device 1000.

In one embodiment, the storage device 1018 or other computer-readable storage media is encoded with computer-executable instructions which, when loaded into the computing device 1000, transform the computer from a general-purpose computing system into a special-purpose computer capable of implementing the embodiments described herein. These computer-executable instructions transform the computing device 1000 by specifying how the CPUs 1004 transition between states, as described above. According to one embodiment, the computing device 1000 has access to computer-readable storage media storing computer-executable instructions which, when executed by the computing device 1000, perform the various processes described above with regard to FIGS. 1-10. The computing device 1000 can also include computer-readable storage media having instructions stored thereupon for performing any of the other computer-implemented operations described herein.

The computing device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computing device 1000 might not include all of the components shown in FIG. 10, can include other components that are not explicitly shown in FIG. 10, or might utilize an architecture completely different than that shown in FIG. 10.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining, by a deception service associated with a network, a threshold amount of computing resource types associated with the network;
   executing a dynamic amount of deception host computing devices to satisfy the threshold amount of computing resource types associated with the network;
   determining a number of deceptions to emulate on the network;
   generating the number of the deceptions to emulate on the deception host computing devices, the deceptions being associated with the computing resource types;
   storing a first mapping between the deceptions and the deception host computing devices, the first mapping being based at least in part on protocols associated with the deceptions and the computing resource types associated with the deception host computing devices; and
   deploying the deceptions to the deception host computing devices based at least in part on the first mapping.

2. The method of claim 1, wherein individual ones of the deceptions comprise:
   emulations of protocols associated with a computing resource type of the computing resource types; or
   an emulation of the computing resource type.

3. The method of claim 1, further comprising:
   receiving, from a computing device associated with the network, a policy indicating a threshold number of deceptions to emulate on the network; and
   determining the number of deceptions to emulate on the network is based at least in part on the policy.

4. The method of claim 1, further comprising:
   determining internet protocol (IP) addresses associated with the network that are available to be allocated;
   assigning subsets of the IP addresses to individual ones of the deceptions; and
   storing a second mapping between the IP addresses and the deceptions based at least in part on assigning the subsets of IP addresses to individual ones of the deceptions,
   wherein deploying the deceptions to the deception host computing devices is based at least in part on the second mapping.

5. The method of claim 4, further comprising:
   determining that a connection associated with a first deception host computing device of the deception host computing devices has been established;
   determining a first IP address associated with the connection, the first IP address being included in a first subset of the subsets of IP addresses;
   based at least in part on the second mapping, identifying a first deception associated with the first IP address, the first deception being deployed to the first deception host computing device and being associated with the first subset of the IP addresses;
   identifying an interaction associated with the first deception;
   determining that the interaction satisfies a threshold interaction for isolating the first deception from the deceptions;
   isolating, based at least in part on determining that the interaction satisfies the threshold interaction, the first deception from the first deception host computing device and the first IP address from the first subset of IP addresses;
   generating, based at least in part on first computing resource types associated with the first deception, a second deception associated with the first computing resource types;
   assigning the first subset of IP addresses to the second deception;

storing a third mapping between the first subset of IP addresses and the second deception based at least in part on assigning the first subset of IP addresses to the second deception; and deploying the second deception to the first deception host computing device based at least in part on the first mapping and the third mapping.

6. The method of claim 4, further comprising:

receiving, from a host computing device associated with the network, a request for a first IP address associated with the network;

determining that the IP addresses associated with the network are unavailable to be allocated;

determining that the first IP address of the IP addresses is assigned to a first deception of the deceptions;

unassigning the first IP address from the first deception;

updating the second mapping between the IP addresses and the deceptions based at least in part on unassigning the first IP address from the first deception; and assigning the first IP address to the host computing device.

7. The method of claim 6, further comprising:

determining that the host computing device has an inactive connection on the network;

determining that an active number of deceptions associated with the network is below a threshold number of deceptions;

unassigning the first IP address from the host computing device;

assigning the first IP address to the first deception; and updating the second mapping between the IP addresses and the deceptions based at least in part on assigning the first IP address to the first deception.

8. A system comprising:

one or more processors; and one or more computer-readable media storing computer-executable instructions that, when executed by the one or more processors, cause the one or more processors to perform operations comprising:

determining, by a deception service associated with a network, a first number of computing resource types associated with the network;

executing a second number of deception host computing devices to satisfy the first number of the computing resource types associated with the network;

determining a third number of deceptions to emulate on the deception host computing devices;

generating the third number of the deceptions, the deceptions being associated with the computing resource types;

storing a first mapping between the deceptions and the deception host computing devices, the first mapping being based at least in part on protocols associated with the deceptions and the computing resource types associated with the deception host computing devices; and deploying the first number of the deceptions to the second number of the deception host computing devices based at least in part on the first mapping.

9. The system of claim 8, wherein individual ones of the deceptions comprise:

emulations of protocols associated with a computing resource type of the computing resource types; or an emulation of the computing resource type.

10. The system of claim 8, the operations further comprising:

receiving, from a computing device associated with the network, a policy indicating a threshold number of deceptions to emulate on the network; and determining the number of deceptions to emulate on the network is based at least in part on the policy.

11. The system of claim 8, the operations further comprising:

determining internet protocol (IP) addresses associated with the network that are available to be allocated;

assigning subsets of the IP addresses to individual ones of the deceptions; and storing a second mapping between the IP addresses and the deceptions based at least in part on assigning the subsets of IP addresses to individual ones of the deceptions, wherein deploying the deceptions to the deception host computing devices is based at least in part on the second mapping.

12. The system of claim 11, the operations further comprising:

determining that a connection associated with a first deception host computing device of the deception host computing devices has been established;

determining a first IP address associated with the connection, the first IP address being included in a first subset of the subsets of IP addresses;

based at least in part on the second mapping, identifying a first deception associated with the first IP address, the first deception being deployed to the first deception host computing device and being associated with the first subset of the IP addresses;

identifying an interaction associated with the first deception;

determining that the interaction satisfies a threshold interaction for isolating the first deception from the deceptions;

isolating, based at least in part on determining that the interaction satisfies the threshold interaction, the first deception from the first deception host computing device and the first IP address from the first subset of IP addresses;

generating, based at least in part on first computing resource types associated with the first deception, a second deception associated with the first computing resource types;

assigning the first subset of IP addresses to the second deception;

storing a third mapping between the first subset of IP addresses and the second deception based at least in part on assigning the first subset of IP addresses to the second deception; and deploying the second deception to the first deception host computing device based at least in part on the first mapping and the third mapping.

13. The system of claim 11, the operations further comprising:

receiving, from a host computing device associated with the network, a request for a first IP address associated with the network;

determining that the IP addresses associated with the network are unavailable to be allocated;

determining that the first IP address of the IP addresses is assigned to a first deception of the deceptions;

unassigning the first IP address from the first deception;

updating the second mapping between the IP addresses and the deceptions based at least in part on unassigning the first IP address from the first deception; and assigning the first IP address to the host computing device.

14. The system of claim 13, wherein:

determining that the host computing device has an inactive connection on the network;

determining that an active number of deceptions associated with the network is below a threshold number of deceptions;

unassigning the first IP address from the host computing device;

assigning the first IP address to the first deception; and updating the second mapping between the IP addresses and the deceptions based at least in part on assigning the first IP address to the first deception.

15. A method comprising:

executing, by a deception service associated with a network, a dynamic amount of deception host computing devices to satisfy a threshold amount of computing resource types associated with the network, the deception host computing devices being configured to emulate a threshold amount of deceptions on the network;

determining that a first device has satisfied a threshold interaction associated with a first deception of the deceptions on the network;

determining a first internet protocol (IP) address associated with the first deception;

isolating the first deception from the deceptions based at least in part on the first IP address;

determining that an amount of deceptions on the network is below the threshold amount of deceptions;

generating a second deception based at least in part on determining that the amount of deceptions on the network is below the threshold amount of deceptions, the second deception having a deception type that is the same as the first deception; and deploying the second deception to be emulated on the deception host computing devices, the second deception being assigned a second IP address that is different from the first IP address.

16. The method of claim 15, wherein determining the first device has satisfied the threshold interaction associated with the first deception comprises at least one of:

determining that the first device has exchanged credentials with the first deception;

determining that the first device has exchanged authorization data with the first deception;

determining that the first device has exchanged authentication data with the first deception; or determining that a Secure Shell (SSH) protocol connection has been established between the first device and the first deception.

17. The method of claim 15, further comprising:

storing a mapping between IP addresses associated with the network and the deceptions on the network;

receiving, from a host computing device associated with the network, a request for an IP address of the IP addresses associated with the network;

determining that the IP addresses associated with the network are unavailable to be allocated;

unassigning the second IP address from the second deception;

assigning the second IP address to the host computing device; and updating the mapping between the IP addresses and the deceptions on the network based at least in part on assigning the second IP address to the host computing device.

18. The method of claim 17, further comprising:

determining that the host computing device has an inactive connection on the network;

determining that the amount of deceptions on the network is below the threshold amount of deceptions;

unassigning the second IP address from the host computing device based at least in part on determining that the host computing device has the inactive connection on the network;

assigning the second IP address to the second deception based at least in part on determining that the amount of deceptions on the network is below the threshold amount of deceptions; and updating the mapping between the IP addresses and the deceptions on the network based at least in part on assigning the second IP address to the host computing device.

19. The method of claim 15, further comprising:

receiving, at a first time that is prior to isolating the first deception, a first query indicating a first hostname associated with the network;

determining that the first hostname is associated with the first deception;

returning, responsive to the first query, the first IP address associated with the first deception;

isolating the first deception from the deceptions at a second time that is subsequent to the first time, wherein the first deception is isolated from the deceptions until a third time that is subsequent to the second time;

receiving, at a fourth time that is subsequent to the second time, a second query indicating the first hostname; and returning, responsive to the second query based at least in part on determining that the fourth time is prior to the third time, the first IP address associated with the first deception.

20. The method of claim 15, further comprising receiving, from a computing device associated with the network, a policy indicating the threshold amount of deceptions to emulate on the network, and wherein the threshold amount of deceptions to emulate on the network includes at least one of:

a number of deceptions to emulate on the network; or a percentage of IP addresses associated with the network that are to be assigned to the deceptions.

* * * * *